(12) United States Patent
Barnard et al.

(10) Patent No.: US 12,060,295 B2
(45) Date of Patent: Aug. 13, 2024

(54) CONVERTER SYSTEMS AND METHODS FOR CONTROLLING OPERATION OF GLASS TUBE CONVERTING PROCESSES

(71) Applicant: CORNING INCORPORATED, Corning, NY (US)

(72) Inventors: Christelle Ruby Barnard, Painted Post, NY (US); Joseph Michael Matusick, Corning, NY (US); Kevin Patrick McNelis, Elmira, NY (US); Connor Thomas O'Malley, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/746,396

(22) Filed: May 17, 2022

(65) Prior Publication Data

US 2022/0371936 A1 Nov. 24, 2022

Related U.S. Application Data

(60) Provisional application No. 63/192,135, filed on May 24, 2021.

(51) Int. Cl.
*C03B 23/045* (2006.01)
*C03B 23/043* (2006.01)
(Continued)

(52) U.S. Cl.
CPC .......... *C03B 23/045* (2013.01); *C03B 23/043* (2013.01); *C03B 23/092* (2013.01); *G05B 19/4099* (2013.01); *G05B 2219/45009* (2013.01)

(58) Field of Classification Search
None
See application file for complete search history.

(56) References Cited

U.S. PATENT DOCUMENTS 3,424,570 A 1/1969 Couquelet
3,482,448 A 12/1969 Gaffard
(Continued)

FOREIGN PATENT DOCUMENTS

CN 1685229 A 10/2005
CN 1872754 A 12/2006
(Continued)

OTHER PUBLICATIONS

Dean Butler, et al., Intelligent software sensors and process prediction for glass container forming processes based on multivariate statistical process control techniques, UKACC International Conference on Control, 2012, pp. 281-285.
(Continued)

*Primary Examiner* — Queenie S Dehghan
(74) *Attorney, Agent, or Firm* — F. Brock Riggs

(57) ABSTRACT

Methods for controlling a converter for converting glass tubes to glass articles include preparing condition sets including settings for a plurality of process parameters, operating the converter to produce glass articles, measuring attributes of the glass articles, operating the converter at each of the condition sets, associating each glass article with a condition set used to produce the glass article and the attributes measured, developing operational models from the attributes measured and the condition sets, determining run settings for each of the plurality of process parameters based on the operational models, and operating the converter with each of the process parameters set to the run settings determined from the operational models.

10 Claims, 12 Drawing Sheets

(51) Int. Cl.
*C03B 23/09* (2006.01)
*G05B 19/4099* (2006.01)

(56) References Cited

U.S. PATENT DOCUMENTS

| | | | |
|---|---|---|---|
| 3,736,118 A | 5/1973 | Heflich et al. | |
| 4,092,142 A | 5/1978 | Dichter | |
| 4,142,883 A | 3/1979 | Dichter | |
| 4,303,435 A | 12/1981 | Sleighter | |
| 4,548,633 A | 10/1985 | Nebelung | |
| 4,615,719 A | 10/1986 | Pauluk et al. | |
| 4,688,474 A | 8/1987 | Anderl | |
| 5,583,337 A | 12/1996 | Chan | |
| 5,611,834 A | 3/1997 | Walter et al. | |
| 6,188,079 B1 | 2/2001 | Juvinall et al. | |
| 6,232,583 B1 | 5/2001 | Uhm | |
| 7,660,642 B1 | 2/2010 | Tuszynski | |
| 8,958,058 B2 | 2/2015 | Bonin et al. | |
| 10,773,989 B2 | 9/2020 | Gaylo et al. | |
| 10,968,133 B2 | 4/2021 | Gaylo et al. | |
| 11,186,513 B2 | 11/2021 | Gaylo et al. | |
| 11,339,079 B2 | 5/2022 | Klingensmith et al. | |
| 11,420,893 B2 | 8/2022 | McEnroe | |
| 2003/0216887 A1 | 11/2003 | Shieh | |
| 2006/0096319 A1 | 5/2006 | Dalstra | |
| 2009/0037013 A1 | 2/2009 | Hendler et al. | |
| 2010/0060902 A1 | 3/2010 | Wornson et al. | |
| 2010/0208242 A1 | 8/2010 | Martinez et al. | |
| 2011/0141264 A1 | 6/2011 | Holtkamp et al. | |
| 2011/0141265 A1 | 6/2011 | Holtkamp et al. | |
| 2014/0174127 A1 | 6/2014 | Dalstra | |
| 2014/0373574 A1 | 12/2014 | Moseler et al. | |
| 2015/0076353 A1 | 3/2015 | Bathelet | |
| 2015/0142163 A1 | 5/2015 | Simon | |
| 2015/0203077 A1 | 7/2015 | Gokan | |
| 2016/0016841 A1 | 1/2016 | Frost et al. | |
| 2016/0214224 A1 | 7/2016 | Jing et al. | |
| 2018/0134603 A1 | 5/2018 | Yoshio | |
| 2019/0161382 A1* | 5/2019 | Gaylo | C03B 23/049 |
| 2019/0195724 A1 | 6/2019 | Jo et al. | |
| 2020/0354255 A1* | 11/2020 | Gerber | C03B 23/095 |
| 2020/0377402 A1 | 12/2020 | Gaylo et al. | |

FOREIGN PATENT DOCUMENTS

| | | |
|---|---|---|
| CN | 104591525 A | 5/2015 |
| CN | 104843981 A | 8/2015 |
| CN | 105271658 A | 1/2016 |
| DE | 19902316 A1 | 8/2000 |
| EP | 1725501 B1 | 5/2008 |
| EP | 2873572 A1 | 5/2015 |
| EP | 3287419 A1 | 2/2018 |
| GB | 2241400 A | 8/1991 |
| IT | 201900005600 A1 | 10/2020 |
| JP | 52-121486 A | 10/1977 |
| JP | 60-098340 A | 6/1985 |
| JP | 02-049930 B2 | 10/1990 |
| JP | 05-072138 A | 3/1993 |
| JP | 07-002138 B2 | 1/1995 |
| JP | 09-008340 A | 1/1997 |
| JP | 2014-114028 A | 6/2014 |
| JP | 2014-129224 A | 7/2014 |
| JP | 2014-184845 A | 10/2014 |
| JP | 2014-208565 A | 11/2014 |
| RU | 2064458 C1 | 7/1996 |
| WO | 2014/010578 A1 | 1/2014 |
| WO | 2016/171214 A1 | 10/2016 |

OTHER PUBLICATIONS

International Search Report and Written Opinion of the International Searching Authority; PCT/US2022/030493; mailed on Aug. 30, 2022, 15 pages; European Patent Office.

* cited by examiner

CONVERTER SYSTEMS AND METHODS FOR CONTROLLING OPERATION OF GLASS TUBE CONVERTING PROCESSES

CROSS-REFERENCE TO RELATED APPLICATIONS

This application claims the benefit of priority under 35 U.S.C. § 119 of U.S. Provisional Application Ser. No. 63/192,135 filed on May 24, 2021, the content of which is relied upon and incorporated herein by reference in its entirety.

FIELD

The present specification generally relates to systems and methods for producing glass articles from glass tubes, in particular, systems and methods for controlling operation of a glass tube converting processes.

TECHNICAL BACKGROUND

Historically, glass has been used as the preferred material for packaging pharmaceuticals because of its hermeticity, optical clarity, and excellent chemical durability relative to other materials. Specifically, the glass used in pharmaceutical packaging must have adequate chemical durability to prevent affecting the stability of the pharmaceutical formulations contained therein. Glasses having suitable chemical durability include those glass compositions within the ASTM standard 'Type IA' and 'Type IB' glass compositions, which have a proven history of chemical durability.

Glass tubing may be converted into other glass articles, such as various glass containers for use in pharmaceutical applications including, without limitation, vials, syringes, ampoules, cartridges and other glass articles. The glass tubing may be converted, for example, in "converting machines." Converting machines have been used for over 75 years, and are currently made by various commercial and internal equipment suppliers. These converting machines typically reform long lengths of glass tube into a plurality of glass articles using steps that include flame working, rotating and stationary tool forming, thermal separation, or score and shock cutoff steps. Various burners and forming tools are often used to shape one or more articles from the glass tube and separate the article from the glass tube.

SUMMARY

During conversion of glass tube to glass articles using a converting machine (i.e., converter), heating elements, such as burners, heat the glass of the glass tube to a temperature at which the viscosity of the glass allows the glass to be formed into one or more features of the glass article. Forming stations include forming tools, such as pin and wheel assemblies, to make contact with the heated glass tube and form the internal and external dimensions of features of the finished glass articles. Conventional converting machines have used simple needle valves to adjust burner output in heating stations. The positions of forming tools on conventional converting machines have been adjusted by mechanical linkages, which are often connected to cam driven shafts. Burner output and positioning and forming tool position and contact timing (e.g., contact time, contact sequence, or both) can affect dimensional yields and defect rates of the converter. Additionally, hundreds of other process settings and inputs on the typical converting machine can influence the dimensional yields and defect rates that can be achieved by the converting machine.

Historically, control strategies for managing the hundreds of process settings and inputs for conventional converting machines have relied on human operators. In particular, these human operators of various experience levels have been relied on to change the burner parameters, forming unit parameters, and overall machine timing for different geometry vials. Human operators manage the normal day to day variation which occurs during this process by adjusting these same parameters. The degree by which a producer is able to consistently make high yield and high quality glass off the converting machines is highly dependant on the skill level and experience of the machine operators operating the converting machines. The variation in experience levels between operators line to line, and shift to shift can cause significant variability in the yield and quality of the vials produced on the process. Despite advances in "add on" control devices and automation, such as mass flow control valves, servo motors, and/or PLC controllers, the current state of the art is that human operators are still making the decisions and ultimately driving all of the input paramaters for the converter.

Accordingly, a need exists for systems and methods for controlling operation of the converter for converting glass tubes into glass articles, such as pharmaceutical packaging to reduce variability in operations and improve yield and reduce defect rates, in particular during start-up and changeovers, after changes to forming tools or other components of the converter, or in response to changes in external inputs and/or long term trends in operating conditions of the converter.

In a first aspect of the present disclosure, a method for controlling a converter for converting glass tubes to glass articles may include preparing a plurality of condition sets, wherein each condition set comprises settings for a plurality of process parameters of the converter. The method may further include operating the converter to convert the glass tube into a plurality of glass articles by translating the glass tube through a plurality of processing stations, measuring one or more attributes of the plurality of glass articles, the glass tube, or both, adjusting one or more of the plurality of process parameters to run the converter at each of the plurality of condition sets, associating each of the plurality of glass articles with a condition set used to produce the glass article and the one or more attributes measured, developing one or more operational models based on the one or more attributes measured and the plurality of condition sets for each of the plurality of glass articles; and operating the converter with each of the plurality of process parameters set to the run setting determined from the one or more operational models.

A second aspect of the present disclosure may include the first aspect, wherein each of the one or more operational models may relate one or more of the plurality of process parameters to the one or more attributes measured, and the method may further comprise determining a run setting for each of the plurality of process parameters based on the one or more operation models.

A third aspect of the present disclosure may include either one of the first or second aspects, wherein the one or more attributes of the plurality of glass articles, glass tubes, or both may comprise one or more dimensions of the plurality of glass articles, one or more cosmetic features of the plurality of glass articles, one or more dimensions of the glass tube, one or more temperatures of the glass tube, or combinations of these.

A fourth aspect of the present disclosure may include any one of the first through third aspects, wherein the plurality of process parameters may comprise a part rate, a holder rotation rate, a burner position in one or more heating stations of the converter, a burner heat output in the one or more heating stations, positions of forming tools in one or more forming stations of the converter, contact timing between forming tools and the glass article in the one or more forming stations, or combinations of these.

A fifth aspect of the present disclosure may include any one of the first through fourth aspects, comprising changing a type of glass article produced by the converter, where the change in the type of the glass article may be characterized by a change in size, shape, or both of the glass article, glass tube, or both; and after changing the type of the glass article produced by the converter, conducting the method of any of the first through fourth aspects.

A sixth aspect of the present disclosure may include any one of the first through fifth aspects, wherein preparing a plurality of condition sets may comprise preparing a first subset of condition sets comprising process parameters relating to forming a glass preform at a working end of the glass tube in one or more heating stations of the converter and preparing a second subset of conditions sets comprising process parameters relating to forming the glass preform into one or more features of the glass article at the working end of the glass tube in one or more forming stations of the converter.

A seventh aspect of the present disclosure may include the sixth aspect, comprising operating the converter at each condition set in the first subset of conditions sets, measuring one or more preform attributes of the glass preform, developing one or more preform operational models based on the one or more preform attributes measured and the first subset of condition sets, determining a run setting for each of the plurality of process parameters in the heating stations based on the one or more preform operational models, and operating the converter with each of the plurality of process parameters of the heating stations set to the run setting determined from the one or more preform operational models.

An eighth aspect of the present disclosure may include the seventh aspect, further comprising while operating the converter with each of the plurality of process parameters of the heating stations set to the run settings, operating the converter at each condition set in the second subset of condition sets, measuring the one or more attributes of the plurality of glass articles, developing one or more forming operational models based on the one or more attributes measured for the plurality of glass articles and the second subset of condition sets, determining a run setting for each of the plurality of process parameters in the forming stations based on the one or more forming operational models, and operating the converter with each of the plurality of process parameters of the forming stations set to the run setting determined from the one or more forming operational models.

A ninth aspect of the present disclosure may include any one of the first through eighth aspects, comprising identifying one or more defective components of the converter, wherein the one or more defective components may affect a dimension, cosmetic attribute, or both of the glass articles. The method may further include replacing the one or more defective components with one or more replacement components and, after replacing the one or more defective components with the one or more replacement components, repeating the method of any one of the first through eighth aspects.

A tenth aspect of the present disclosure may include any one of the first through nineth aspects, wherein each of the plurality of condition sets may comprise settings for a subset of the plurality of process parameters of the converter.

An eleventh aspect of the present disclosure may include any one of the first through tenth aspects, comprising identifying one or more defective forming tools in one or more forming stations of the converter, wherein the one or more defective forming tools may comprise one or more forming tools that no longer produce glass articles meeting dimensional standards for the glass articles. The methods may further include replacing the one or more defective forming tools in the one or more forming stations with one or more replacement forming tools and after replacing the one or more defective forming tools with the one or more replacement forming tools, repeating the method of any one of the first through tenth aspects.

A twelfth aspect of the present disclosure may include the eleventh aspect, wherein each of the plurality of condition sets may comprise settings for a subset of the plurality of process parameters, and the subset of the plurality of process parameters of the converter may include a position of the one or more replacement forming tools, contact timing of the glass tube with the one or more replacement forming tools, or both.

A thirteenth aspect of the present disclosure may include any one of the first through twelfth aspects, wherein associating each of the plurality of glass articles with the condition set and the one or more attributes measured for the glass article, glass tube, or both may comprise assigning a unique identifier to each of the plurality of glass articles as it is produced; tracking each of the plurality of glass articles produced through the converter by the unique identifier, and associating the unique identifier of each of the plurality of glass articles with the condition set used to produce the glass article and the one or more attributes measured for the glass article, the glass tube, or both.

A fourteenth aspect of the present disclosure may include the thirteenth aspect, wherein the unique identifier of each of the plurality of glass articles may be associated with the condition set and the one or more attributes through a relational database.

A fifteenth aspect of the present disclosure may include any one of the first through fourteenth aspects, further comprising while operating the converter at the run setting for each of the plurality of process parameters, measuring the one or more attributes for each of the plurality of glass articles, glass tubes, or both. The method may further include determining one or more predicted attributes for each of the plurality of glass articles, glass tubes, or both from the plurality of process settings and the one or more operational models, and comparing the one or more attributes measured for each of the plurality of glass articles, glass tubes, or both to the one or more predicted attributes to identify deviations from normal operation.

A sixteenth aspect of the present disclosure may include the fifteenth aspect, further comprising identifying an upset condition of the converter based on the comparison of the one or more attributes measured for each of the plurality of glass articles, glass tubes, or both to the one or more predicted attributes based on the one or more operational models. The method may further include correcting the upset condition of the converter and repeating the method of any one of the first through fourteenth aspects following correction of the upset condition.

A seventeenth aspect of the present disclosure may include any one of the first through sixteenth aspects, further comprising repeating the method of any one of the first through sixteenth aspects.

An eighteenth aspect of the present disclosure may include the seventeenth aspect, comprising repeating the method of claim any one of the first through sixteenth aspects according to a regular periodic time interval.

A nineteenth aspect of the present disclosure may include either one of the seventeenth or eighteenth aspects, comprising repeating the method of any of the first through sixteenth aspects in response to a change in one or more external inputs to the converter.

A twentieth aspect of the present disclosure may include the nineteenth aspect, wherein the one or more external inputs may include variations in dimensions or quality of the glass tubes supplied to the converter, ambient thermal conditions in a manufacturing environment of the converter, wear of system components of the converter, changes in composition of fuel gas to burners of the converter, or combinations of these.

A twenty-first aspect of the present disclosure may include any one of the first through twentieth aspects, wherein the plurality of processing stations comprise one or a plurality of heating stations, forming stations, separating stations, piercing stations, measurement stations, or combinations of these.

A twenty-second aspect of the present disclosure may be directed to a system for converting glass tubes into glass articles. The system may include a converter comprising a plurality of holders, each of which may be operable to hold a glass tube and rotate the glass tube about a center axis of the glass tube. The converter may further include a plurality of processing stations comprising at least one heating station, at least one forming station, and at least one separating station. The converter may further include at least one measurement device operable to measure one or more attributes of each of the glass articles produced from the glass tubes, each of the glass tubes, or both. The system may further include a control system communicatively coupled to the converter, the control system comprising one or more processors, one or more memory modules communicatively coupled to the one or more processors, and machine readable and executable instructions stored on the one or more memory modules. The machine readable and executable instructions, when executed by the one or more processors, may cause the control system to automatically operate the converter to convert the glass tubes into the glass articles; measure one or more attributes of the glass articles, the glass tubes, or both with the at least one measurement device; adjust a plurality of process parameters of the converter to run the converter at each of a plurality of condition sets, wherein each of the plurality of condition sets may comprise settings for the plurality of process parameters; associate each of the plurality of glass articles with one of the plurality of condition sets that is used to produce the glass article and the one or more attributes measured; and develop one or more operational models based on the one or more attributes measured and the plurality of condition sets. Each of the one or more operational models may relate one or more of the plurality of process parameters to the one or more attributes of the glass articles, the glass tubes, or both.

A twenty-third aspect of the present disclosure may include the twenty-second aspect, wherein the machine readable and executable instructions, when executed by the one or more processors, further may cause the control system to automatically determine a run setting for each of the plurality of process parameters based on the one or more operational models and operate the converter with each of the plurality of process parameters set to the run setting determined from the one or more operational models.

A twenty-fourth aspect of the present disclosure may include the twenty-third aspect, wherein the machine readable and executable instructions, when executed by the one or more processors, further may cause the control system to automatically measure the one or more attributes for each of the plurality of glass articles, glass tubes, or both while operating the converter with each of the plurality of process parameters set to the run setting; determine one or more predicted attributes for each of the plurality of glass articles, glass tubes, or both from the plurality of process settings and the one or more operational models; compare the one or more attributes measured for each of the plurality of glass articles, glass tubes, or both to the one or more predicted attributes; and identify a deviation from normal operating conditions based on the comparison.

A twenty-fifth aspect of the present disclosure may include either one of the twenty-third or twenty-fourth aspects, wherein the machine readable and executable instructions, when executed by the one or more processors, further may cause the control system to automatically update the one or more operational models according to a regular periodic time interval, in response to a user input, in response to a change in operating hardware of the converter, in response to a change in one or more external inputs to the converter, or combinations of these.

A twenty-sixth aspect of the present disclosure may include the twenty-fifth aspect, wherein the machine readable and executable instructions, when executed by the one or more processors, further may cause the control system to automatically update the one or more operational models in response to the change in the one or more external inputs to the converter. The one or more external inputs to the converter may comprise variations in dimensions or quality of the glass tubes supplied to the converter, ambient thermal conditions in a manufacturing environment of the converter, wear or failure of system components of the converter, changes in composition of fuel gas to burners of the converter, or combinations of these.

A twenty-seventh aspect of the present disclosure may include either one of the twenty-fifth or twenty-sixth aspects, wherein when updating the one or more operational models, the machine readable and executable instructions, when executed by the one or more processors, further may cause the control system to automatically retrieve the plurality of condition sets from the one or more memory modules; operate the converter to convert the glass tubes into a plurality of glass articles; measure one or more attributes of the plurality of glass articles, the glass tubes, or both with the at least one measurement device; adjust one or more of the plurality of process parameters to run the converter at each of the plurality of condition sets; associate each of the plurality of glass articles with the condition set used to produce the glass article and the one or more attributes measured; update the one or more operational models based on the one or more attributes measured and the plurality of condition sets for each of the plurality of glass articles; determine the run setting for each of the plurality of process parameters based on the one or more updated operational models; and operate the converter at the run setting for each of the plurality of process parameters.

A twenty-eighth aspect of the present disclosure may include any one of the twenty-second through twenty-seventh aspects, wherein the machine readable and executable instructions, when executed by the one or more processors, further may cause the control system to automatically assign a unique identifier to each of the plurality of glass articles as it is produced, track each of the plurality of glass articles produced through the converter by the unique identifier, and associate the unique identifier of each of the plurality of glass articles with the condition set used to produce the glass article and the one or more attributes measured for the glass article, the glass tube from which the glass article is produced, or both.

A twenty-ninth aspect of the present disclosure may include the twenty-eighth aspect, further comprising a relational database stored on the one or more memory modules. The machine readable and executable instructions, when executed by the one or more processors, further may cause the control system to automatically store the unique identifier, the condition set, and the one or more attributes measured for each glass article, glass tube, or both in the relational database.

A thirtieth aspect of the present disclosure may include any one of the twenty-second through twenty-ninth aspects, wherein the machine readable and executable instructions, when executed by the one or more processors, further may cause the control system to automatically receive an input indicative of a change in a type of glass article produced by the converter from a first glass article to a second glass article, wherein the change in the type of the glass article may comprise a change in size, shape, or both of the glass article, glass tube, or both; operate the converter to convert the glass tubes into a plurality of second glass articles; measure one or more attributes of the plurality of second glass articles using the at least one measurement device; adjust one or more of the plurality of process parameters to run the converter at each of the plurality of condition sets; associate each of the plurality of second glass articles with the condition set used to produce the second glass article and the one or more attributes measured; develop one or more operational models for the second glass article based on the one or more attributes measured and the plurality of condition sets for each of the plurality of second glass articles; determine a run setting for each of the plurality of process parameters based on the one or more second operational models; and operate the converter with each of the plurality of process parameters set to the run setting determined from the one or more second operational models.

A thirty-first aspect of the present disclosure may include any one of the twenty-second through thirtieth aspects, wherein the machine readable and executable instructions, when executed by the one or more processors, further may cause the control system to automatically receive an input indicative of replacement of one or more components of the converter; develop a sub set of condition sets, wherein the sub set of condition sets may comprise settings for a subset of process parameters of the converter relating to the replacement of the one or more components; operate the converter to convert the glass tubes into a plurality of glass articles; measure one or more attributes of the plurality of glass articles, the glass tubes, or both using the at least one measurement device; adjust one or more of the plurality of process parameters to run the converter at each of the condition sets in the subset of condition sets; associate each of the plurality of glass articles with the condition set used to produce the glass article and the one or more attributes measured; update the one or more operational models based on the one or more measured attributes and the subset of condition sets for each of the plurality of glass articles; determine a run setting for each of the plurality of process parameters based on the one or more updated operational models; and operate the converter with each of the plurality of process parameters set to the run setting determined from the one or more updated operational models.

A thirty-seoncond aspect of the present disclosure may include any one of the twenty-second through thirty-first aspects, wherein the one or more attributes of the glass article, the glass tube, or both may comprise one or more dimensions of the glass article, one or more cosmetic attributes of the glass article, one or more dimensions of the glass tube, one or more temperatures of the glass tube, or combinations of these.

A thirty-third aspect of the present disclosure may include any one of the twenty-second through thirty-second aspects, wherein the plurality of process parameters may comprise a part rate, a holder rotation rate, a burner position in the at least one heating station, a burner heat output in the at least one heating station, positions of forming tools in the at least one forming station, contact timing between forming tools and the glass article in the at least one forming station, or combinations of these.

A thirty-fourth aspect of the present disclosure may include any one of the twenty-second through thirty-third aspects, wherein the converter may be operable to translate the glass tubes in each of the plurality of holders through the plurality of processing stations and the at least one measurement station.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
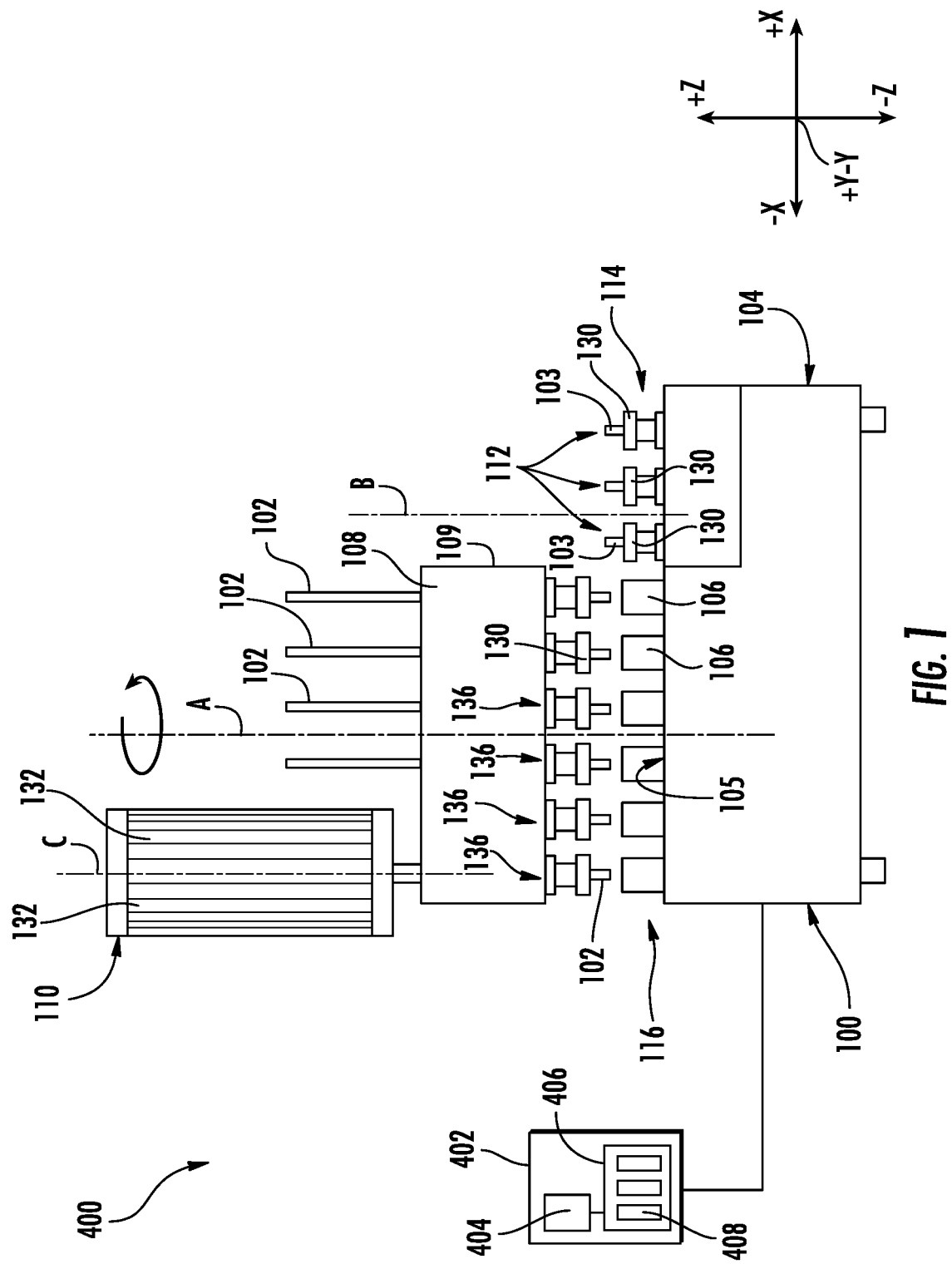
FIG. 1 schematically depicts a front view of an embodiment of system comprising a a converter for producing glass articles from glass tubes, according to one or more embodiments shown and described herein.

Reference will now be made in detail to embodiments of systems and methods of the present disclosure for controlling operation of a glass tube converting process for producing glass articles, examples of which are illustrated in the accompanying drawings. Whenever possible, the same reference numerals will be used throughout the drawings to refer to the same or like parts. The methods disclosed herein for controlling a converter for converting glass tubes to glass articles. The methods of the present disclosure may include preparing a plurality of condition sets. Each condition set may include settings for a plurality of process parameters of the converter. The methods may further include operating the converter to convert the glass tube into a plurality of glass articles, measuring one or more attributes of the plurality of glass articles, the glass tubes, or both, adjusting one or more of the plurality of process parameters to run the converter at each of the plurality of condition sets, and associating each of the plurality of glass articles with a condition set used to produce the glass article and the attributes measured. The methods may further include developing one or more operational models based on the measured attributes and the condition sets for each of the glass articles. Each of the operational models may relate one or more of the plurality of process parameters to one or more of the attributes measured for the glass articles, glass tubes, or both. The methods may further include determining a run setting for one or more process parameters based on the operational models and operating the converter with the process parameters set to the run setting determined from the operational models.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "working end" of the glass tube is the end of the glass tube oriented towards the processing stations of the main turret of the converter relative to the holder, and the "non-working end" of the glass tube is the end of the glass tube oriented away from the processing stations of the main turret.

As used herein, a "dwell time" of the converter refers to the duration of time that the glass tube spends in a particular processing station before passing to the next subsequent processing station.

As used herein, the term "active time" refers to a duration of time that the glass tube is maintained in engagement with at least one heating element or at least one forming tool while in a particular processing station.

As used herein, the term "index time," when used in relation to an index converter, refers to a duration of time that it takes to index the glass tube from one processing station to the next processing station. The "dwell time," "active time," and "index time" are all measured in units of time.

When used in relation to a heating station, "engagement" of the burner 302 with the glass tube 102 may refer to placing the burner 302 in a position in which the flame from the burner 302 extends towards the glass tube 102 or contacts the glass tube 102 to heat the glass tube 102. Conversely, when the burner 302 is out of engagement with the glass tube 102, the burner 302 is placed in a position in which the flame from the burner 302 is directed away from the glass tube 102 or moved far enough away from the glass tube 102 so that the flame does not contact or directly heat the glass tube 102.

When used in relation to forming tools 324 in a forming station 204, the term "engagement" refers to the forming tools 324 contacting the glass tube 102. When a forming tool 324 is out of engagement, the forming tool 324 does not contact the glass tube 102.

As used herein, the term "part rate" refers to the production rate or throughput rate of the converter in units of number of glass articles per unit time.

As used herein, the term "circumference" of the glass tube refers to a collection of points of the glass tube 102 at constant radius r from the center axis D of the glass tube 102 at a particular Z position (i.e., position on the +/−Z axis of the figures) through 360 degrees. A circumference of the glass tube 102 may coincide with an outer surface 140 of the glass tube 102 at a particular Z position or an inner surface 146 of the glass tube 102 at a specific Z position, for example.

As used herein, the term "run" refers to the normal steady state operation of the converter. Thus, as used herein, a "run setting" refers to a setting of the converter for normal steady state operation of the converter.

As used herein, the terms "upstream" and "downstream" refer to the positioning of processing stations of the converter relative to each other. A first processing station is considered "downstream" of a second processing station if the glass tube encounters the second processing station before encountering the first processing station. Likewise, the first processing station is considered "upstream" of the second processing station if the glass tube encounters the first processing station before encountering the second processing station.

Glass tubing may be converted into glass articles, in particular glass articles for use in pharmaceutical applications, which may include, without limitation, vials, syringes, ampoules, cartridges and other glass articles. The glass tubing may be converted into these glass articles using a converter, such as a converting machine, comprising a plurality of processing stations. The processing stations may include heating stations, forming stations, thermal separating stations, and piercing stations, among other types of processing stations. The converting machines typically reform long glass tube lengths into a plurality of glass articles using steps that include, but are not limited to, flame working, rotating and stationary tool forming, separation (e.g., thermal separation or score and shock cut-off steps), piercing cooling, measuring, or other processing step. Thus, glass articles produced through a converting process conducted on a converting machine are subjected to a series of flame burners or other heating elements and forming tools to shape the glass tube to specific shapes and dimensions and separate a formed glass article from the glass tube.

Referring now to FIG. 1, one embodiment of the converter 100 for producing glass articles from a glass tube 102 is schematically depicted. The converter 100 may be used to convert glass tubes 102 into a plurality of glass articles. The converter 100 may include a base 104 having a plurality of processing stations 106 and a main turret 108 positioned above the base 104 and rotatable relative to the base 104 about the central axis A. The converter 100 may further include a glass tube loading turret 110 positioned above the main turret 108 for feeding glass tubes 102 to the main turret 108. The converter 100 may also include a plurality of secondary processing stations 112 on the base 104 and a secondary turret 114, which may be rotatable relative to the base 104.

As schematically depicted in FIG. 1, the base 104 of the converter 100 may be stationary and the processing stations 106 may be coupled to an upper portion 105 of the base 104. The plurality of processing stations 106 may be spaced apart from one another and arranged in a main circuit 116. In embodiments, the main circuit 116 may be circular so that the main turret 108 may index or continuously move a glass tube 102 through the plurality of processing stations 106 by rotation of the main turret 108 about the central axis A. Alternatively, in other embodiments, the main circuit 116 may be linear arrangement of the processing stations 106. Although described herein in reference to a circular-shaped layout of processing stations 106, it is understood that the subject matter disclosed herein may apply equally well to converters having other arrangements of the processing stations 106, such as linear, curvilinear, or irregular-shaped arrangements of processing stations 106.

The type and/or shape of the glass articles to be made from the glass tube 102 may influence the total number of processing stations 106 of the converter 100. The number of processing stations 106 of the main turret 108 may be from 14 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, measuring feeding, discharge stations, other processing stations, or combinations of these for producing the glass articles from the glass tubes 102. The type and/or shape of the article to be made from the glass tube 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 may include a plurality of holders 130, which are configured to removably secure each glass tube 102 to the main turret 108. The holders 130 may be clamps, chucks, or other holding devices, or combinations of holding devices. The holders 130 may orient each glass tube 102 so that the glass tube 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle such that the glass tube 102 is non-vertical during processing. Each of the holders 130 may extend from a bottom portion 109 of the main turret 108 in a direction towards the base 104 (i.e., in the −Z direction relative to the coordinate axis in FIG. 1). Each holder 130 may be oriented to position the glass tube 102 in or proximate to each of the successive processing stations 106 of the main circuit 116 of the base 104 as the main turret 108 is indexed about the central axis A. Vertical orientation of the glass tubes 102 allows a downward protruding portion of each glass tube 102 to be moved or indexed progressively through the processing stations 106. In embodiments, the converter 100 may be operable to index each of the plurality of holders 130 progressively through the plurality of processing stations 106. Indexing may refer to the stepwise process of moving the glass tube 102 into a processing station 106, maintaining the glass tube 102 at a stationary position XYZ position in the processing station 106 for a dwell time, and then indexing the glass tube 102 to the next processing station 106. Alternatively, in embodiments, the converter 100 may be operable to translate the plurality of holders 130 continuously through the converting process. In embodiments, the processing stations 106 may translate with the glass tube 102 during the active time of the glass tube 102 in the processing station.

Each holder 130 may be individually rotatable relative to the main turret 108 to rotate the glass tube 102 about center axis D of the glass tube 102, which may be generally parallel to the central axis A of the main turret 108. Each of the holders 130 may be operatively coupled to a motor (not shown), continuous drive belt, or other drive mechanism for rotation of each of the holders 130 relative to the main turret 108. Rotation of the holders 130 allows for rotation of the glass tube 102 about center axis D of the glass tube 102 relative to stationary burners, forming tools, cooling nozzles, or other features of the processing stations 106. The heating element or forming tools in the processing station 106 may be maintained in a fixed position relative to the glass tube 102, and the rotation of the glass tube 102 about center axis D may enable exposure of the entire circumference of the glass tube 102 to the heating elements or forming tools.

Figure 2:
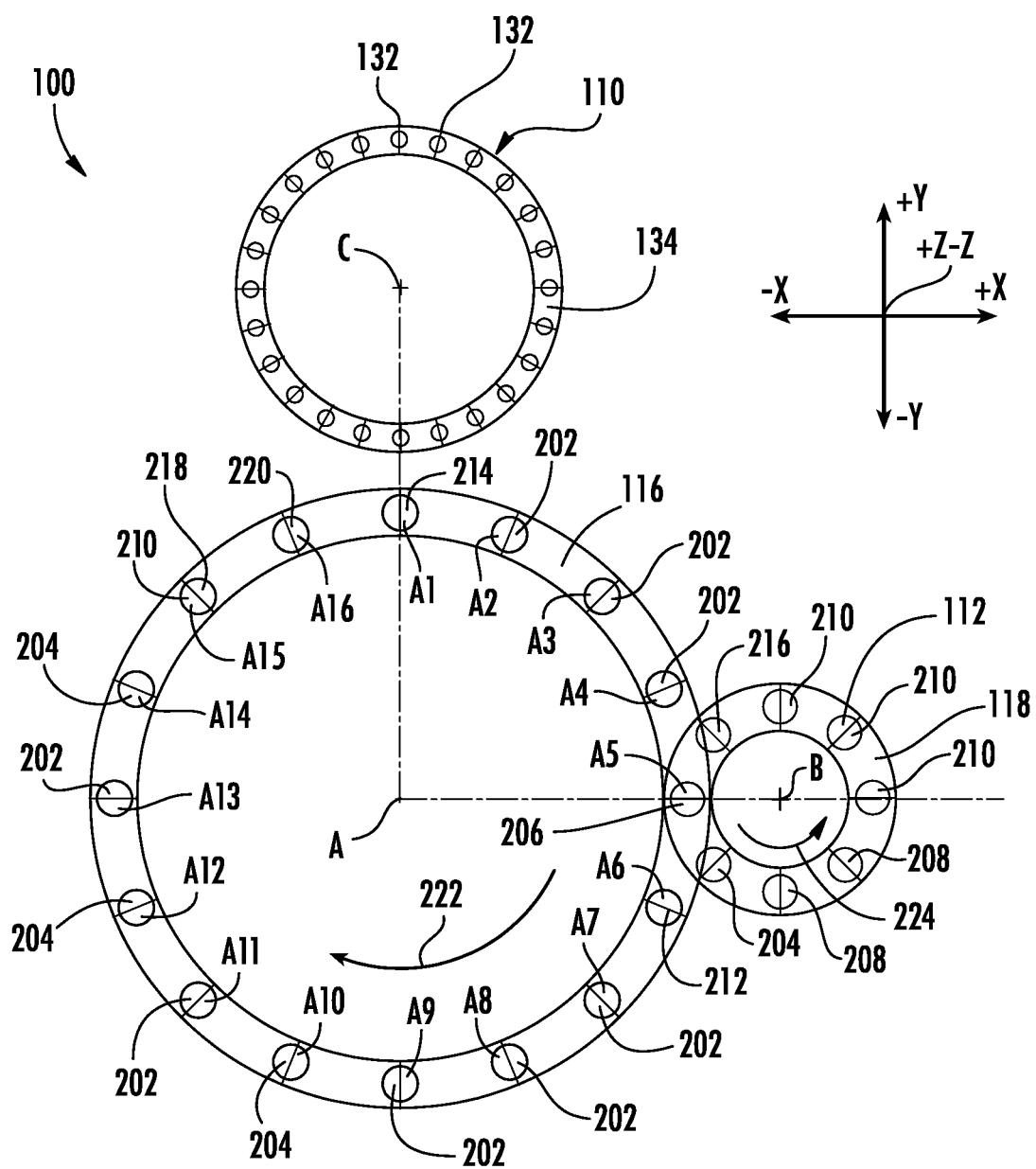
FIG. 2 schematically depicts a top view of a main turret, a secondary turret, and a feed turret of the converter of FIG. 1, according to one or more embodiments shown and described herein.

Referring to FIGS. 1 and 2, the converter 100 may include a plurality of secondary processing stations 112, which may also be spaced apart and arranged in a secondary circuit 118 (FIG. 2). The converter 100 may include a secondary turret 114 (FIG. 1) for indexing or continuously moving an article 103 (FIG. 1), which has been separated from the glass tube 102, through the plurality of secondary processing stations 112. The secondary turret 114 may be rotatable about a second axis B relative to the base 104. The second axis B may be generally parallel to central axis A of the main turret 108. The secondary turret 114 may also include a plurality of holders 130 to hold the glass articles 103 and position the glass articles 103 to engage with each of the secondary processing stations 112 in succession. The secondary turret 114 may receive the glass articles 103 from a separating station 206 (FIG. 2) of the main turret 108, index or continuously move the articles 103 through the plurality of secondary processing stations 112 through rotation of the secondary turret 114, and discharge the finished articles from the converter 100. Although shown in a circular pattern, it is understood that the secondary processing stations 112 may be arranged in a linear, curvilinear, or irregular arrangement. The secondary processing stations 112 may be referred to as a bottom forming machine. For vials, the secondary processing stations 112 may be operable to form bottom of the vial.

The glass tube loading turret 110 may be positioned adjacent to the main turret 108 in a position from which the glass tube loading turret 110 is capable of loading a new length of glass tube 102 into the holders 130 of the main turret 108 in at least one processing station 106. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. Referring to FIGS. 1 and 2, in embodiments, the glass tube loading turret 110 may include a plurality of loading channels 132 arranged in a circular circuit 134 and configured to hold glass tubes 102. The glass tube loading turret 110 may be positioned to orient one of the loading channels 132 into vertical alignment (i.e., aligned in a direction parallel to the central axis A of the main turret 108 and/or parallel to the Z axis of FIG. 1) with a processing station 106 of the main circuit 116 of the converter 100 and the corresponding holders 130 on the main turret 108 that are moved through the processing station 106 of the main circuit 116. In embodiments, the processing station 106 aligned with the glass tube loading turret 110 may be a tube loading station 214 (FIG. 2). When the converter 100 has converted all or at least a portion of the glass tube 102 at a specific holder position 136 into one or more articles, the glass tube loading turret 110 may deliver a new length of glass tube 102 through the top of the main turret 108 to the holder 130 at the holder position 136, when the holder position 136 indexes into alignment with the tube loading station 214 (FIG. 2). Alternatively or additionally, in embodiments, the converter 100 may include an arm (not shown) movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods and apparatuses for delivering new lengths of glass tube 102 to the main turret 108 are contemplated.

Referring now to FIG. 2, as previously described, the plurality of processing stations 106 of the converter 100 may include one or more heating stations 202, forming stations 204, separating stations 206, cooling stations 210, piercing stations 212, tube loading stations 214, discharge stations 216, measuring stations 218, tube length drop stations 220, or other stations and/or combinations of these stations. FIG. 2 schematically depicts the arrangement of the processing stations 106 for a converter 100 having a main circuit 116 of sixteen processing stations 106 and a secondary circuit 118 of eight secondary processing stations 112. As previously described, the processing stations 106 of the main circuit 116 may be evenly spaced apart and evenly distributed about a circular circuit, and the secondary processing stations 112 of the secondary circuit 118 may also be evenly spaced apart and evenly distributed about a circular circuit. FIG. 2 also schematically depicts the glass tube loading turret 110 having a plurality of loading channels 132. In FIG. 2, the glass tube loading turret 110 is shown in a position spaced apart from the main circuit 116 for purposes of illustration. Although the glass tube loading turret 110 is depicted as having twenty-four loading channels 132, it is understood that the glass tube loading turret may have more or less than twenty-four loading channels 132.

The main circuit 116 of the converter schematically depicted in FIG. 2 may include one or more heating stations 202, a separating station 206, a piercing station 212, one or more forming stations 204, one or more cooling stations 210, a measuring station 218, a tube length drop station 220, and a tube loading station 214. Although FIG. 2 depicts the main circuit 116 as having a circular arrangement of the processing stations 106, as previously discussed, the main circuit 116 may have the processing stations 106 positioned in other non-circular-shaped arrangements, such as linear, curvilinear, irregular-shaped, or other arrangements. With respect to the direction of indexing 222 of the main turret 108, the heating stations 202 may be positioned before each of the forming stations 204 and the separating stations 206 to preheat target regions of the glass tube 102 to a viscosity at which the glass becomes deformable and may effectively be shaped or stretched and separated. At the separating station 206, the formed glass article 103 (FIG. 1) may be separated from the glass tube 102 (FIG. 1) as its bottom is concurrently formed. The separating station 206 may also be the processing station 106 at which the partially formed glass article 103, once separated, is transferred to the secondary turret 114 (FIG. 1) to be indexed through the secondary circuit 118 of secondary processing stations 112. The piercing station 212 may be positioned on the main circuit 116 downstream of the separating station 206 in the direction of indexing 222 of the main turret 108. At the piercing station 212, a meniscus 350 (FIG. 8) of the glass tube 102 previously formed in the separating station 206 is pierced, thereby reopening the working end 150 of the glass tube 102.

Referring again to FIG. 2, the forming stations 204 of the main turret 108 may be positioned downstream of the piercing station 212 and one or more heating stations 202 in the direction of indexing 222. The one or more forming stations 204 may iteratively shape the glass tube 102 to form one or more features of the finished glass article. As noted above, one or more heating stations 202 may be positioned before each of the forming stations 204 to preheat target regions of the glass tube 102 to a temperature at which the glass tube 102 may be shaped and formed into the desired features. The forming stations 204 of the main turret 108 may shape the working end 150 (FIG. 3A) of the glass tube 102 to form features at one end of the glass articles 103, and the forming stations 204 of the secondary turret 114 may shape the other end of the glass articles 103 after the glass article 103 has been separated from the glass tube 102. In embodiments, the converter 100 may be used to produce vials from the glass tubes 102, and the forming stations 204 of the converter 100 may include one or more shoulder forming stations, flange forming stations, flange finishing stations, or combinations of these with one or more heating stations 202 positioned before and between each of the forming stations 204.

The main circuit 116 may further include a measuring station 218, at which at least one measurement device may be used to measure one or more attributes of the glass tube 102, such as the diameter and thickness for example, or one or more dimensions of the features of the glass article 103 formed by the forming stations 204. Feature dimensions may include, but are not limited to, flange thickness, flange length, neck length, neck thickness, overall article length, article inside or outside diameter, other feature dimension, or combinations thereof. One or more cosmetic attributes of the glass tube 102 or glass article 103 may also be assessed in the measuring station 218. Cosmetic attributes may include, but are not limited to defects in one or more features (e.g., defects in the flange, neck, etc.) of the glass article 103, overall desireability, or combinations of these. Overall desireability may be a composite property based on a plurality of other dimension or cosmetic attributes measured for the glass article 103. In embodiments, the measuring station 218 may be positioned directly after the last forming station 204 so that the dimensions are measured while the glass tube 102 is still at elevated temperature. Alternatively, the measuring station 218 may be positioned after one or more cooling stations 210 to measure the dimensions of the glass tube 102 and/or glass article 103 at a lower temperature. In embodiments, the secondary circuit 118 of the converter 100 may include a measuring station 218.

Still referring to FIG. 2, one or more cooling stations 210 may be positioned after the forming stations 204 in the direction of indexing 222 of the main turret 108. A tube length drop station 220 may be positioned after the forming stations 204, between the forming stations 204 and the separating station 206, to drop the partially formed glass tube 102 down, thereby positioning the glass tube 102 for separating the glass article 103 from the glass tube 102 at the separating station 206. The main circuit 116 may also include a tube loading station 214 for loading a new length of glass tube 102 feedstock from the glass tube loading turret 110 to the main turret 108 (FIG. 1). In embodiments, the tube loading station 214 may be incorporated into a cooling station 210. The tube loading station 214 may be positioned between the last forming station 204 and the separating station 206.

Figure 4:
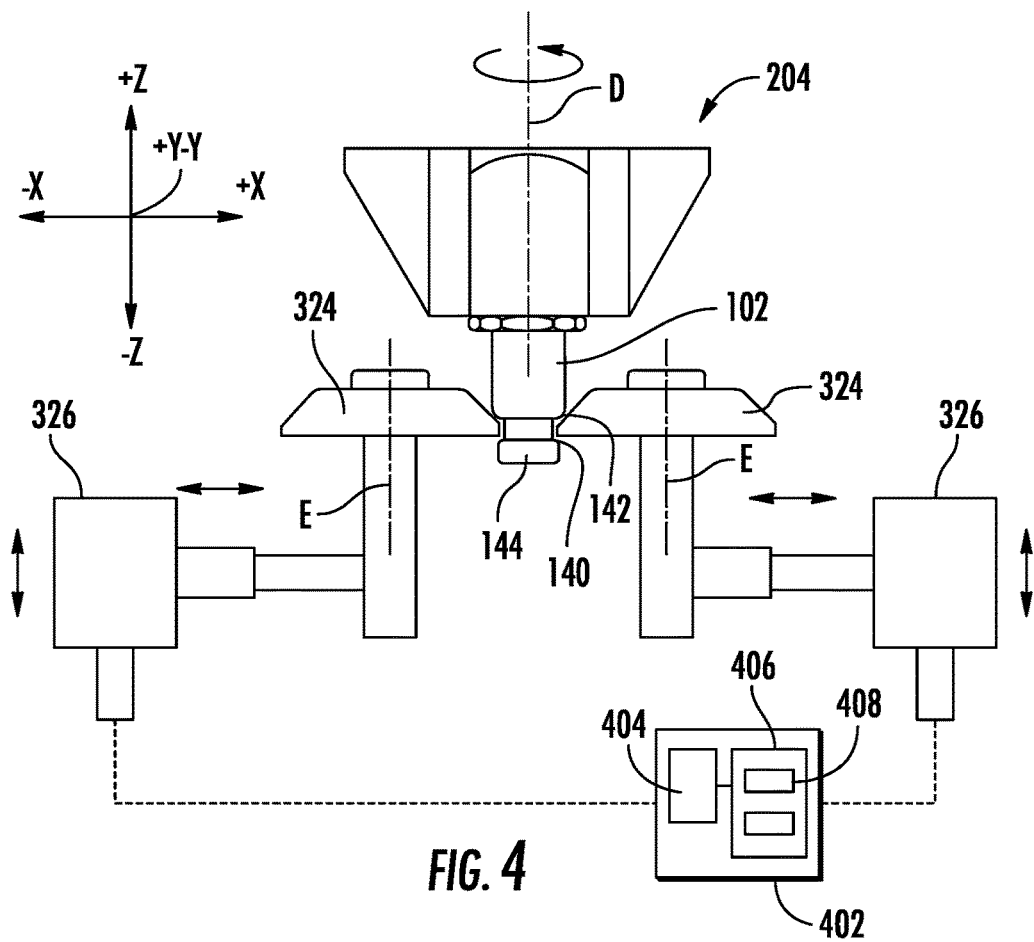
FIG. 4 schematically depicts one embodiment of a forming station of the converter of FIG. 1, according to one or more embodiments shown and described herein.

The forming stations 204 of the main turret 108 can form features at a first end of the glass article 103. For example, the forming stations 204 may form the shoulder 142 and flange 144 at the top (first end) of a glass article 103 that is a vial or cartridge, as shown in FIG. 4. Referring again to FIG. 2, once the glass article 103 is separated from the glass tube 102 at the separating station 206, the glass article 103 may be transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103. The secondary turret 114 may rotate about the axis B in a direction 224 that is opposite from the the main turret 108. In embodiments, the secondary turret 114 may rotate in a direction that is the same as the main turret 108.

The secondary processing stations of the secondary circuit may include one or more heating stations 202, forming stations 204, polishing stations 208, cooling stations 210, discharge stations 216, or other stations or combinations of secondary processing stations 112. Although FIG. 2 depicts the secondary circuit as having a circular arrangement of the secondary processing stations 112, as previously discussed, the secondary circuit may have the secondary processing stations 112 positioned in other non-circular arrangements, such as linear, curvilinear, irregular-shaped, or other arrangements. In embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article 103 may be discharged from the converter 100.

The previous description of the processing stations 106 of the main circuit 116 and the secondary processing stations 112 of the secondary circuit 118 may represent a typical converter 100 for producing vials from the glass tube 102. However, it is understood that more or fewer processing stations 106 and secondary processing stations 112 may be utilized to make vials having different shapes or features or other glass articles, such as cartridges, syringes, ampoules, or other pharmaceutical glass articles. Additionally, it is understood that the processing stations 106 and secondary processing stations 112 may be arranged in any of a number of different orders and/or configurations in order to produce differently shaped glass articles.

Figure 3:
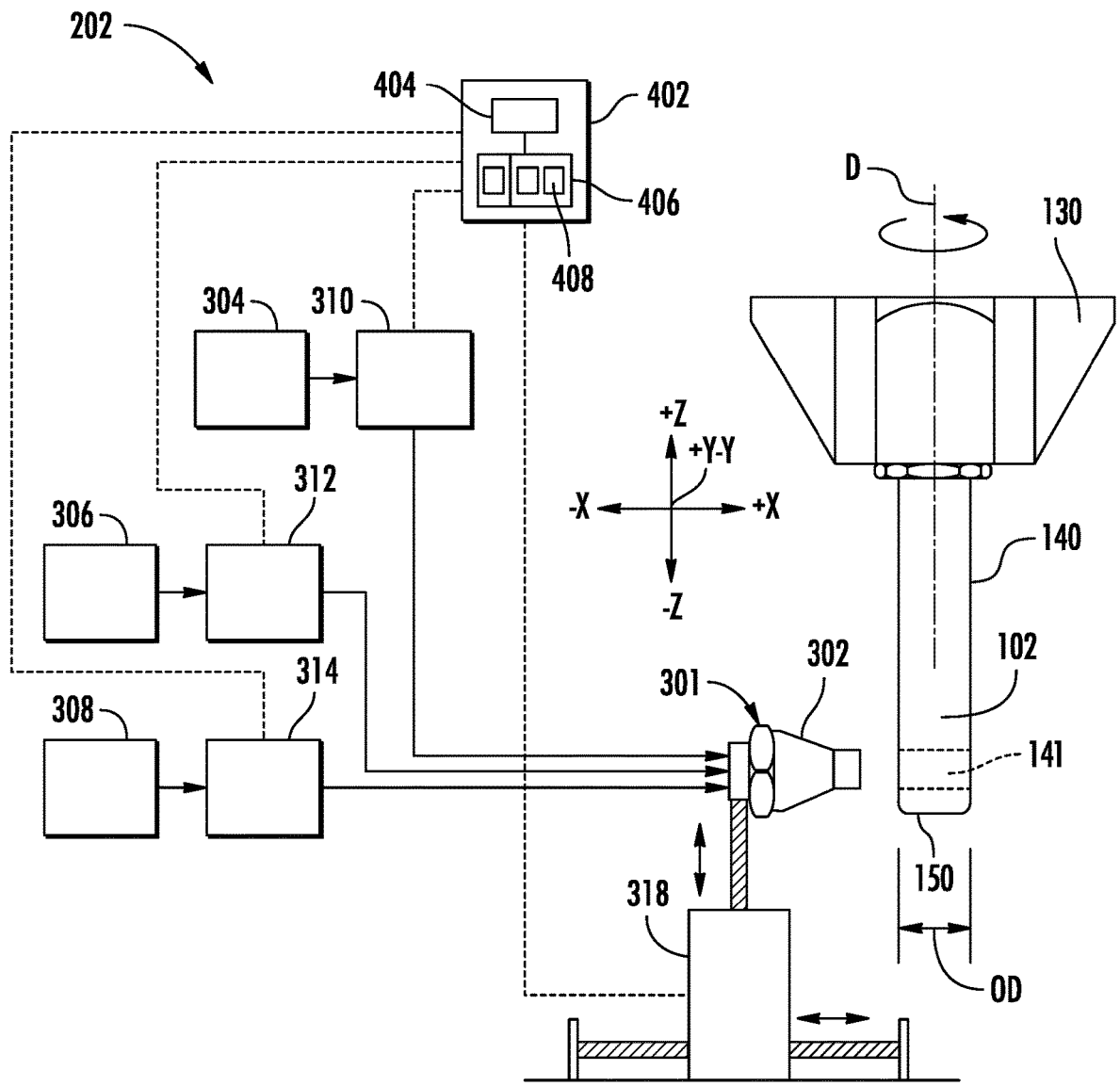
FIG. 3 schematically depicts a heating station of the converter of FIG. 1, according to one or more embodiments shown and described herein.

Referring now to FIG. 3, a heating station 202 of the converter 100 is schematically depicted. Each of the heating stations 202 may include one or more heating elements 301. As illustrated in FIG. 3, in embodiments, the heating element 301 may include one or more burners 302, which are used to heat targeted regions of the glass tube 102 prior to a forming operation performed at the forming station 204 (FIG. 2) or separating operation performed at the separating station 206 (FIG. 2). Although FIG. 3 depicts a single burner 302, it is understood that a plurality of burners 302 may be employed in a single heating station 202. Each burner 302 may be fluidly coupled to a fuel gas supply 304, an oxygen supply 306, and, optionally, an air supply 308. Examples of fuel gases for the burner 302 may include, but are not limited to hydrogen, hydrocarbon fuel gases such as methane, propane, and butane for example, other fuel gases, or combinations of these.

Each burner 302 may include a fuel control valve 310 to control the flow rate of fuel gas to the burner 302. Each burner 302 may also include an oxygen control valve 312 to control the mass flow rate of oxygen to the burner 302. Each burner 302 may further include an air control valve 314 for optionally controlling a flow rate of air to the burner 302. The burner 302 combusts the fuel gas in the presence of oxygen and/or air to produce a flame that heats at least the target region of the glass tube 102. Although the heating stations 202 of the converter 100 are described herein as heating the glass tube 102 using burners, it is understood that other heating elements or methods other than burners may be used to heat the glass tube 102. Other heating elements may include, but are not limited to, lasers such as $CO_2$ lasers for example, induction heaters, other heating devices, or combinations of these.

The heating station 202 may further include a burner positioner 318 coupled to the burner 302. The burner positioner 318 may be operable to positon the burner 302 vertically (e.g., in the +/−Z direction of the coordinate axis in FIG. 3), horizontally (e.g., in the X-Y plane identified by the coordinate axis in FIG. 3), or a combination of these directions relative to the glass tube 102 in the heating station 202. In embodiments, each burner positioner 318 may include one or a plurality of servo motors operable to automatically and/or incrementally adjust the position of the burner 302 in one or a plurality of directions. Any other type of positioner that is or will become commercially available may be used for the burner positioner 318. The burner positioner 318, fuel control valve 310, oxygen control valve 312, air control valve 314, or combinations of these may be communicatively coupled to the control system 402 to enable the control system 402 to control the vertical position, horizontal position, heat output, or combinations thereof of burners 302.

Figure 5:
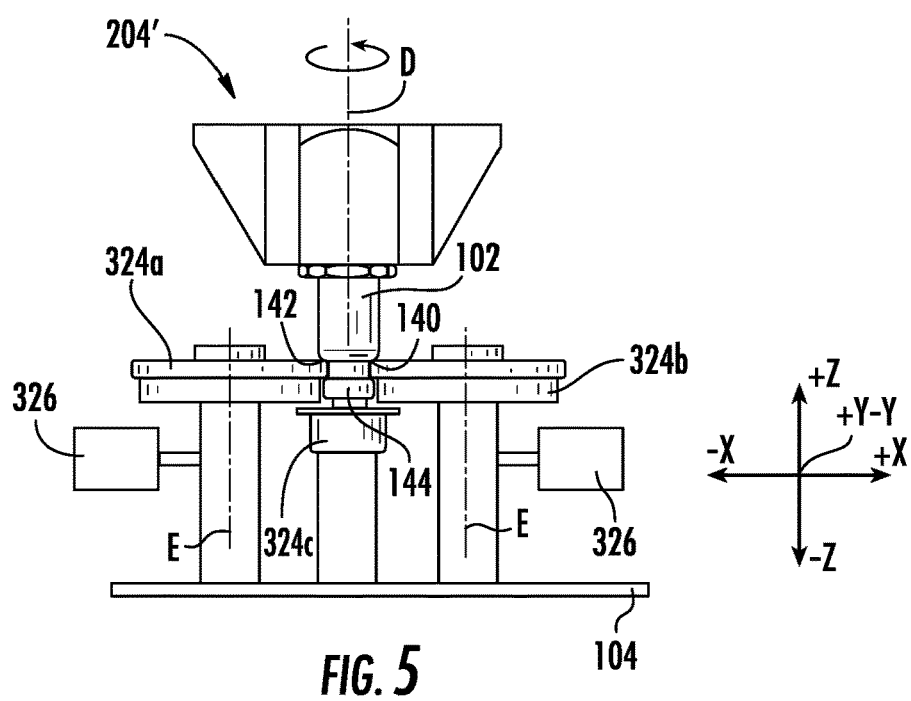
FIG. 5 schematically depicts another embodiment of a forming station of the converter of FIG. 1, according to one or more embodiments shown and described herein.

Referring now to FIGS. 4 and 5, examples of forming stations 204 of the converter 100 are schematically depicted. Each forming station 204 may include one or more forming tools 324 rotatable relative to the base 104 (FIG. 1) about tooling axis E. When passed into the forming station 204, the glass tube 102, which has been heated in a prior heating station 202, is rotated by the holder 130. The forming tools 324 may engage with the glass tube 102 as it rotates. When engaged, contact of the forming tools 324 with the heated glass tube 102 may form the glass tube 102 into the desired shape. The forming tools 324 may be contacted with the glass tube 102 for an active time of the forming tools 324. Upon expiration of the active time, the forming tool actuators 326 may withdraw the forming tools 324 from engagement with the glass tube 102. FIG. 4 schematically illustrates an embodiment of a forming station 204 for forming the shoulder 142 of a glass vial. FIG. 5 schematically depicts an exemplary embodiment of a forming station 204' for forming the flange 144 of a glass vial. The forming station 204' for forming the flange 144 comprises three forming tools 324a, 324b, and 324c. Other types of forming tools 324 may be employed in the forming station 204 depending on the desired features of the glass article 103.

Referring again to FIG. 4, the forming tool actuators 326 may be operable to move the forming tools 324 into and out of engagement with the glass tube 102. Moving the forming tools 324 into and out of engagement with the glass tube 102 may control the contact timing of the forming tools 324 with the glass tube 102. The contact timing of the forming tools 324 with the glass tube 102 refers to the timing of engaging and disengaging each of the forming tools 324 in a forming station 204 with the glass tube 102. Adjusting the contact timing of the forming tools 324 may adjust the total contact time of each of the forming tools 324 in contact with the glass tube 102, the contact sequence of the forming tools 324 with the glass tube 102, or both. The contact time refers to the duration of time that the forming tools 324 are engaged or in contact with the glass tube 102. The contact sequence of the forming tools 324 with the glass tube 102 may refer to the timing of the engagement and disengagement of each individual forming tool 324 of a forming station 204 with the glass tube 102. Referring to FIG. 5, in some cases, the contact sequence may be adjusted so that each of the forming tools 324a, 324b, and 324c initially contact the glass tube 102 at the same moment in time. In other instances, the contact sequence may be adjusted so that forming tool 324c (pin) contacts the inner surface of the glass tube 102 before or after the forming tools 324a and 324b (wheels) contact the outer surface of the glass tube 102 at the beginning of the contact time. The contact sequence may also include the order of disengagement of each of the forming tools 324a, 324b, 324c from the glass tube 102 at the end of the contact time. The term "contact timing" is intended to include both total contact time and/or contact sequence of engagement of the forming tools 324 with the glass tube 102.

The forming tool actuators 326 may further be operable to change the forming position the forming tools 324 vertically (e.g., in the +/−Z direction of the coordinate axis in FIG. 3), horizontally (e.g., in the X-Y plane identified by the coordinate axis in FIG. 4), or a combination of these directions relative to the glass tube 102 in the forming station 204. The forming position of the forming tools 324 refers to the forming tool position when the forming tool 324 are engaged with the glass tube 102. In embodiments, each forming tool actuator 326 may include one or a plurality of servo motors operable to automatically and/or incrementally adjust the positions of the forming tools 324 in one or a plurality of directions of the coordinate axis in FIG. 4. Any other type of positioner that is or will become commercially available may be used as at least a portion of the forming tool actuator 326. The forming tool actuators 326 may be communicatively coupled to the control system 402 to enable the control system 402 to change the vertical or horizontal positioning of the forming tools 324 when in the forming position. The vertical or horizontal position of the forming tools 324 may be the position of the forming tools 324 when the forming tools 324 are engaged with the glass tube 102.

Figure 6:
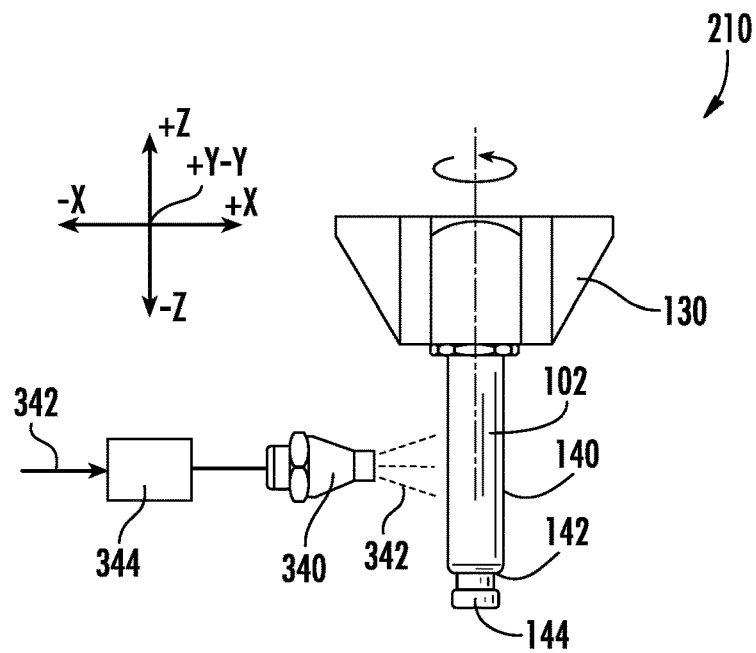
FIG. 6 schematically depicts a cooling station of the converter of FIG. 1, according to one or more embodiments shown and described herein.

Referring now to FIG. 6, a cooling station 210 is schematically depicted. The cooling station 210 may include one or a plurality of cooling nozzles 340 positioned to direct a cooling fluid 342, such as chilled air or an inert gas for example, towards the glass tube 102. One or more of the cooling nozzles 340 may be positioned to direct the cooling fluid 342 to specific regions of the glass tube 102. One or more cooling fluid control valves 344 may be fluidly coupled to the cooling nozzles 340 to control the mass flow rate of cooling fluid 342 to the cooling nozzles 340, which enable control of the rate of cooling of the glass tube 102 as well as the temperature of the glass tube 102 and temperature gradients in the glass tube 102. The cooling station 210 may further include a cooling nozzle positioner (not shown) coupled to the cooling nozzle 340 and operable to positon the cooling nozzle 340 relative to the glass tube 102. The cooling nozzle positioner, cooling fluid control valves 344, or both may be communicatively coupled to the control system 402 (FIG. 1) to enable the control system 402 to control the vertical and/or horizontal position of the cooling nozzle 340 and/or the flow rate of cooling fluid 342.

Figure 7:
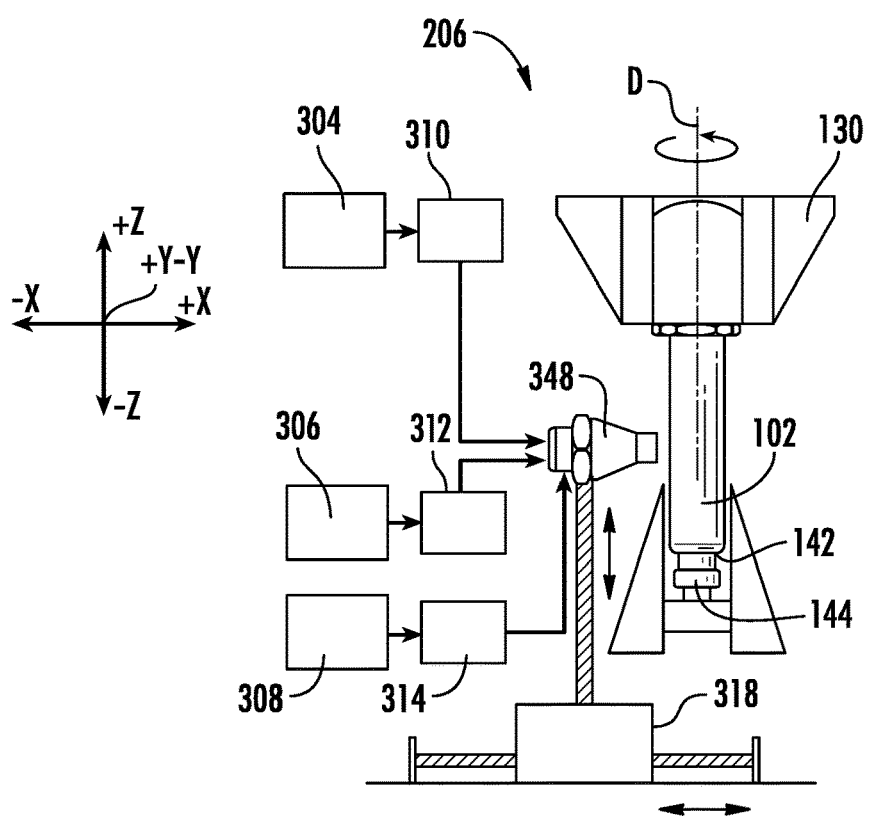
FIG. 7 schematically depicts a separating station of the converter of FIG. 1, according to one or more embodiments shown and described herein.

Referring now to FIG. 7, a separating station 206 of the converter 100 is schematically depicted. The separating station 206 depicted in FIG. 7 is a thermal separation station and may be positioned after one or more heating stations 202 in the direction of indexing 222 of the main turret 108. The heating stations 202 positioned before the separating station 206 may heat the glass tube 102 to make the glass viscous. The separating station 206 may include a separating burner 348. The separating burner 348 may have any of the features previously described for burners 302, including but not limited to a fuel gas control valve 310, an oxygen control valve 312, and/or an air control valve 314. While the glass tube 102, which has been made viscously deformable by the previous heating stations 202, is rotated by the holder 130 about the center axis D of the glass tube 102, the separating burner 348 may be engaged with the outer surface 140 of the glass tube 102 to heat the glass tube 102 to a temperature at which the viscosity of the glass causes the partially formed glass article to separate from the glass tube 102. Once separated from the glass tube 102, the partially formed article may be transferred to the secondary turret 114 (FIG. 1) or discharged from the converter 100. Although shown in FIG. 7 as a thermal separating station, the separating station 206 may also be a non-thermal separating station such as a separating station using score and break techniques, as may be used for syringes and cartridges for example.

Like the heating station 202, the separating station 206 may also include a burner positioner 318 coupled to the separating burner 348. The burner positioner 318 may be operable to positon the separating burner 348 vertically (e.g., in the +/−Z direction of the coordinate axis in FIG. 3), horizontally (e.g., in the X-Y plane identified by the coordinate axis in FIG. 7), or a combination of these directions relative to the glass tube 102 in the separating station 206. The burner positioner 318, fuel control valve 310, oxygen control valve 312, air control valve 314, or combinations of these may be communicatively coupled to the control system 402 (FIG. 3) to enable the control system 402 to control the vertical position, horizontal position, heat output, or combinations of these of the separating burner 348.

Figure 8:
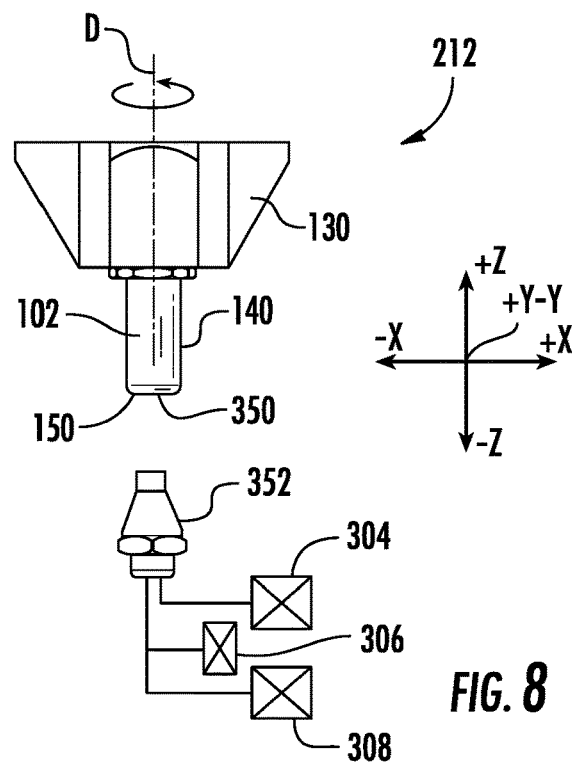
FIG. 8 schematically depicts a piercing station of the converter of FIG. 1, according to one or more embodiments shown and described herein.

Referring now to FIG. 8, one embodiment of a piercing station 212 of the converter 100 is schematically depicted. The piercing station 212 may be positioned after the separating station 206 in the direction of indexing 222 of the main turret 108. As previously described, thermal separation of the article 103 from the glass tube 102 in the separating station 206 may cause a meniscus 350 of glass to form across the working end 150 of the glass tube 102. In the piercing station, the meniscus 350 is pierced in preparation for forming the next article at the working end 150 of the glass tube 102.

In embodiments, the piercing station 212 may include a piercing burner 352. The piercing burner 352 may be positioned below the working end 150 of the glass tube 102 and may be oriented toward the working end 150 of the glass tube 102. The piercing burner 352 may be fluidly coupled to one or more of a fuel gas supply 304, oxygen supply 306, air supply 308, or combinations of these. The fuel gas supply 304, the oxygen supply 306, and the air supply 308 were previously discussed in relation to the burner 302 of FIG. 3. The piercing station 212 may also include a fuel gas control valve 310, oxygen control valve 312, and/or air control valve 314 for controlling heat output from the piercing burner 352. When main turret 108 indexes the glass tube 102 into the piercing station 212, the flame from the piercing burner 352 heats the meniscus 350 of glass and melts the meniscus 350 to pierce the meniscus 350 and re-open the working end 150 of the glass tube 102. In embodiments, the meniscus 350 may be pierced by directing a stream of gas, such as compressed air, nitrogen, argon, or other gas, at the meniscus 350 or across the meniscus 350. In embodiments, mechanical means or other methods may be used to pierce the meniscus 350 instead of using a piercing burner 352. Various methods of piercing the meniscus 350 are disclosed in U.S. Pat. No. 10,968,133, entitled "METHODS FOR MINIMIZING SHR IN GLASS ARTICLES BY PRODUCING A GAS FLOW DURING PHARMACEUTICAL PART CONVERTING," granted Apr. 6, 2021; co-pending U.S. application Ser. No. 16/197,187, entitled "SYSTEMS AND METHODS FOR MINIMIZING SHR FROM PIERCING DURING PHARMACEUTICAL PART CONVERTING USING A GAS FLOW," filed Nov. 20, 2018; co-pending U.S. application Ser. No. 16/197,971, entitled "SYSTEMS AND METHODS FOR MINIMIZING SHR FROM PIERCING DURING PHARMACEUTICAL PART CONVERTING USING NEGATIVE PRESSURE EVACUATION," filed Nov. 21, 2018; and co-pending U.S. application Ser. No. 16/198,041, "SYSTEMS AND METHODS FOR MINIMIZING SHR FROM PIERCING FROM PHARMACEUTICAL PART CONVERTING USING PULSED EJECTION," filed Nov. 21, 2018, the entire contents of all of which are incorporated by reference in the present disclosure. Positioners, control valves, and other control devices may be incorporated into the piercing station 212 and communicatively coupled to the control system (FIG. 1) to control various operating parameters of the piercing station 212.

Figure 9:
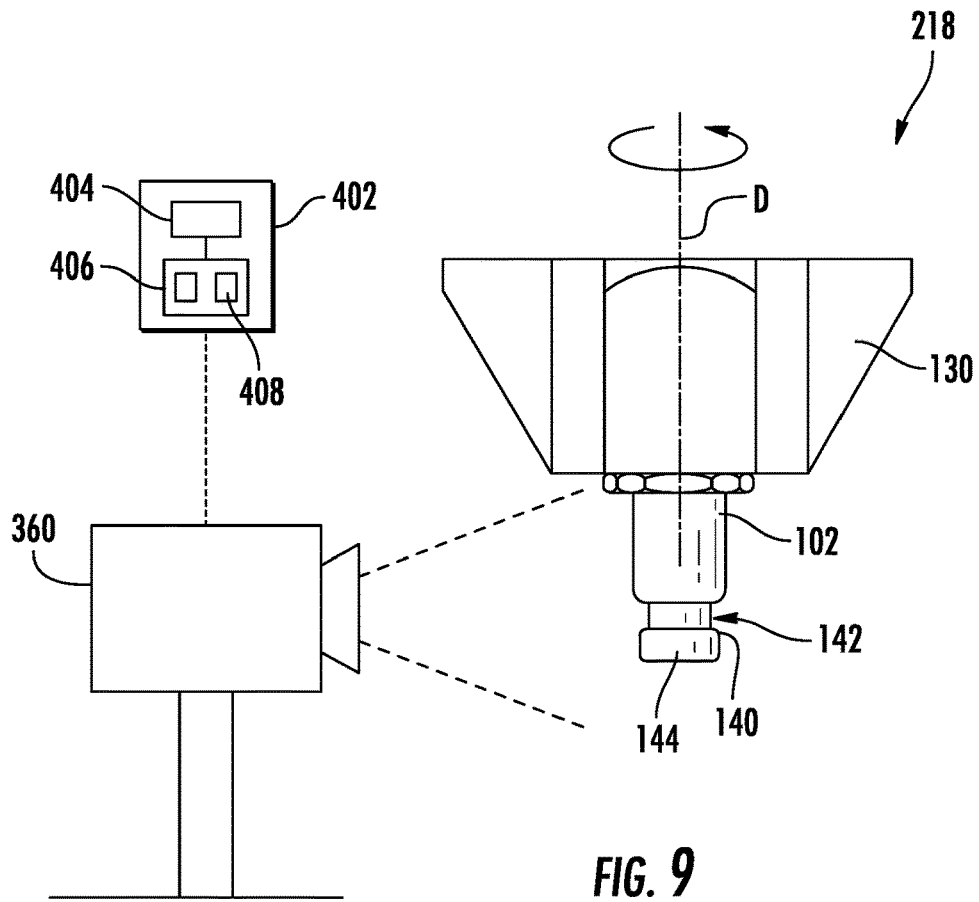
FIG. 9 schematically depicts a measuring station of the converter of FIG. 1, according to one or more embodiments shown and described herein.

Referring now to FIG. 9, a measuring station 218 is schematically depicted. The measuring station 218 may include one or a plurality of measurement devices 360 positioned to measure one or a plurality of attributes of the glass tube 102, and glass article 103, or both. The attributes may include one or more physical dimensions, one or more cosmetic properties, or both of the glass tube 102, the glass article 103, or both. The measurement device 360 in the measuring station 218 may be any of the measurement devices described herein. The measurement devices 360 may be communicatively coupled to the control system 402 to transmit information relating to the one or more attributes of the glass tube 102, glass article 103, or both to the control system 402.

FIGS. 3-9 include schematic illustrations of several different examples of processing stations 106 that may be utilized in the converter 100. However, it should be understood that other processing stations 106 having different structures, combinations of structures, or functions, may be utilized to achieve the desired conversion of the glass tube 102 into one or more glass articles.

Figure 10:
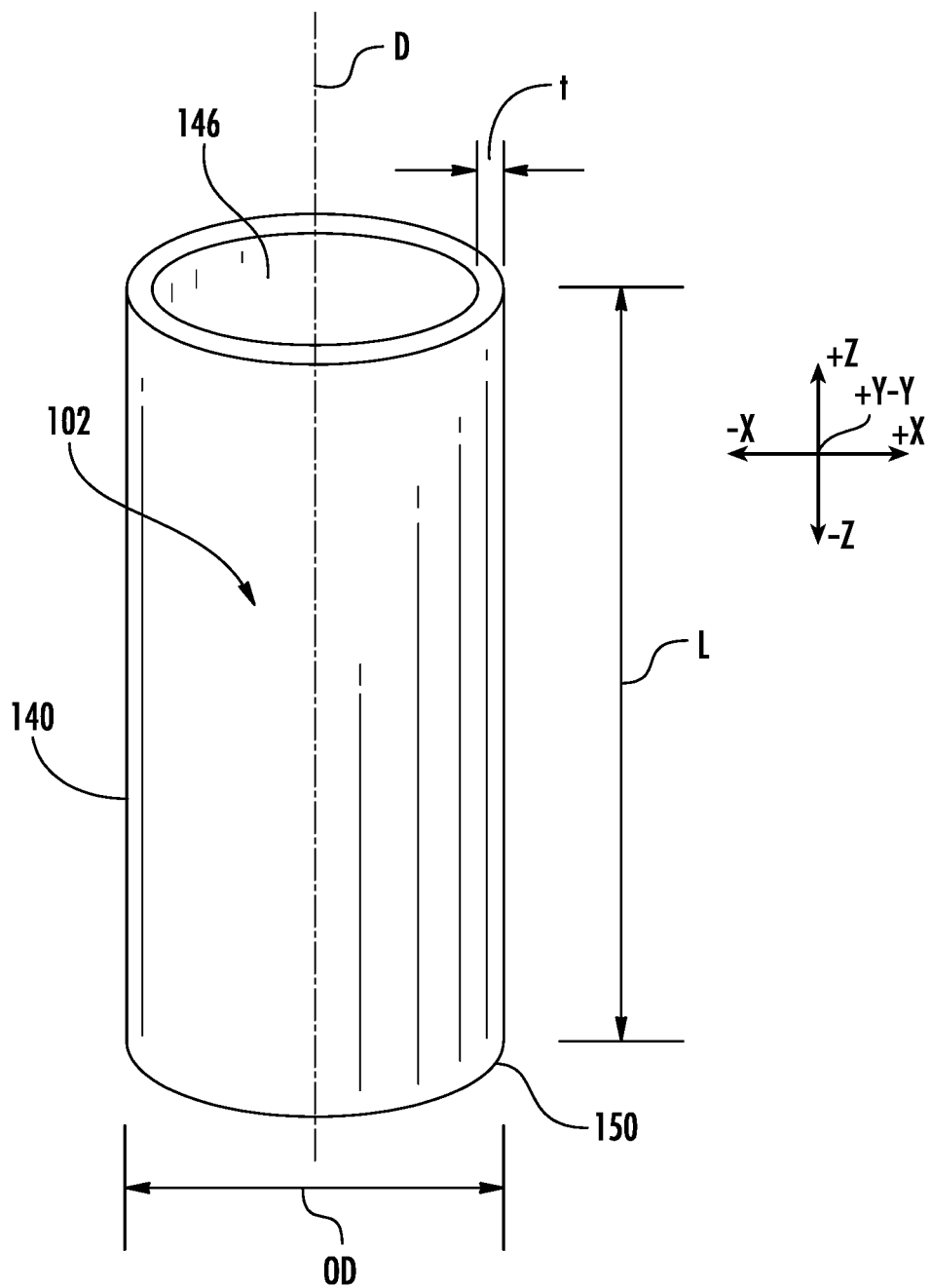
FIG. 10 schematically depicts a perspective view of a section of a glass tube prior to conversion in the converter of FIG. 1, according to one or more embodiments shown and described herein.

Referring now to FIG. 10, the glass tube 102 may be an elongated hollow cylindrical tube made from glass. The glass tube 102 may have a circular cross-sectional shape and may have an outer surface 140, an inner surface 146, and a thickness t. The thickness t of the glass tube 102 may be a radial distance between the inner surface 146 and the outer surface 140 of the glass tube 102. The glass tube 102 may have a length L in the +/−Z direction of the coordinate axis of FIG. 10. The glass tube 102 may have an outside diameter OD as shown in FIG. 10. As previously discussed, the glass tube 102 may be rotated about center axis D of the glass tube 102 throughout the converting process. The working end 150 of the glass tube 102 is the end of the glass tube 102 that is oriented in the −Z direction of the coordinate axis in FIG. 10 when the glass tube 102 is secured in the holder 130 of the converter 100. The non-working end of the glass tube 102 is the end opposite the working end 150 (i.e., the end of the glass tube 102 in the +Z direction of the coordinate axis of FIG. 10.

Referring again to FIGS. 1 and 2, in operation, the main turret 108 may index or move the glass tubes 102, which are secured in the holders 130, into a processing station 106. A specific operation, such as heating, forming, piercing, separating, cooling, dropping, feeding measuring, etc. may be performed on the glass tubes 102 at each of the processing stations 106. The converter 100 may be tuned so that all of the processing stations 106 complete their operations within the dwell time. At the end of the dwell time, the main turret 108 may index the glass tubes 102 to the next processing stations 106. For an indexing converter, the total time per part per station, as used in this disclosure, is the sum of the dwell time and the index time.

In embodiments, the converter 100 may be a continuous converter operable to move the glass tubes 102 and holders 130 continuously through the plurality of processing stations 106. In embodiments, the heating elements, burners, forming tools, measurement devices, and other elements of the converting process may move with the glass tube 102 as it passes through the processing station 106. For both an indexing converter and a continuous converter, an "active time" of the processing station is a duration of time that the glass tube 102 is maintained in engagement with at least one heating element, at least one forming tool, at least one cooling nozzle, or other device while in the processing station 106.

Examples of converters 100 for converting glass tube 102 into glass vials include the Vial Forming Machine Models RP16 or RP18 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098 Vial Forming Machine manufactured by Euromatic S.R.L., which has 36 processing stations. Another example may include the Zeta 103 Cartridge Forming Machine manufactured by Euromatic S.R.L., which is a converter for converting glass tube into glass cartridges. The cartridge converter has similar characteristics to the previously described vial converters 100 but is utilized to produce glass articles having a cartridge form factor rather than a vial.

Although described in the context of a converter 100 for producing glass vials from glass tube 102, it should be understood that the converter 100 may be configured to produce one or more other articles, such as other types of pharmaceutical containers or articles, by changing the forming tools 324 and/or the order or configuration of processing stations 106 in the main circuit 116 or secondary processing stations 112 in one or more secondary circuits 118. Pharmaceutical articles may include, but are not limited to vials, cartridges, syringes, ampoules, jars, or other glass pharmaceutical articles.

During operation of the converter 100, the burner output of the burners 302 and positioning of the burners 302 can have a significant impact on the dimensional yield and defect rates of the converter 100. The positions of the forming tools 324 relative to the glass tube 102 can also have a significant impact on the dimensional yield and defect rate of the converter 100. Further, the contact timing (i.e., total contact time and/or contact sequence) of the forming tools 324 in contact with the glass tube 102 can greatly impact dimensional tolerancing and flaws in the glass articles 103 made from the glass tube 102. The total contact time in conventional converting machines has been intrinsically linked to the machine index rate which further complicates and restricts the process window of the conventional converting machines for producing high yield and high-quality products. The contact sequence of contacting the forming tools 324 with the glass tube 102 can also impact dimensional tolerancing and flaws in the glass articles 103. Additionally, the converter 100 may have hundreds of other inputs and process settings across all of the processing stations 106 that need to be managed appropriately and consistently to produce high manufacturing yields and high-quality products.

Historically, on conventional converting machines, the burner outputs required to heat the glass tubes 102 to sufficient viscosity for forming have been controlled by simple needle valves fluidly coupled to a manifold of glass, oxygen, and air. In the forming stations of conventional converting machines, the positions of the forming tools, which often include forming pins and wheel, have been set by simple mechanical linkages connected to cam driven shafts. For conventional glass tube converting machines, the control strategy for managing all of the process inputs and settings has been historically to use human operators. These human operators of various experience levels have been relied on to change burner parameters, forming unit parameters, and overall machine timing for different geometry glass articles, such as vials, syringes, ampoules, cartridges, etc. Human operators have also been relied on to manage and account for the normal day-to-day variations that occur during the converting process by adjusting these same parameters. The degree by which a producer is able to consistently produce high yields of hig-quality glass articles from the converting machines has, therefore, been highly dependant on the skill level and experience of the human operators they use for operating the converting machines. The variation in experience levels between operators line to line, and shift to shift can cause significant variability in the yield and quality of the glass articles produced by the converting process.

Changes in the type or size of glass article being produced typically involves lost production time resulting from setting up the converting machine for the new type or size of glass article. For a change to a glass article that has been previously produced, records of the previous process settings may be available. However, despite the availability of records or knowledge of previous process settings for a particular type or size of glass article, skilled and experienced human operators can still require one to two days, or even more, to adjust the converting machine to the new glass article and achieve acceptable product yields and quality. If the type or size of glass article has not been previously produced on the converting machine, development of the best process settings for the new type or size of glass article can take weeks before the converting machine and converting process are ready for steady state production at acceptable product yields and quality. Prolonged setup when changing from one type or size of glass article to another can result in high yield loss for the converting process.

High yield loss can also occur from events like changes in forming tools in the forming stations or other maintenance activities. Forming tools and other components of the converter 100 experience wear and need to be serviced or replaced periodically. When a worn forming tool or other component is replaced or other maintenance activity performed, at least some of the process parameters on the converter 100 need to be adjusted. These adjustments are often difficult for experienced human operators to manage, and incorrect adjustements can often make yield upsets worse and more prolonged. Additionally, normal variation in the converting process or variations in external inputs to the converting process can also require adjustments to the converter. Variability can occur with incoming tubing mass, thermal growth of the turret over time, tool wear gradually changing tool dimensions, burners degrading over time, etc. This variability manifests itself as shifts or trends in the glass attributes over time, and the way the operators react to these changing attributes can significantly impact the yield and quality of the glass articles at steady state.

Some modern automation technologies have been developed and have become "add on" features for some glass tube converting machines in recent years. In particular, mass flow control valves have been incorporated to replace the manual needle valve to set the gas and oxygen flows to the various burners. Servo motors have replaced the adjustable linkages used to position forming tools in forming stations. More advanced PLC's have allowed for timing and velocity profiles to be applied to each servo driven device significantly advancing control of forming stations compared to the previous cam driven machines. However, the current state of the art is that human operators are still making the decisions on selection and adjustment of process parameters, even though doing so is through interaction with more sophisticated software and technology.

Thus, there is a continued need for systems and methods for controlling operation of glass tube converting processes and converters 100. The systems and methods disclosed herein solve the problems in the existing state of the art by providing for systematic modelling of the operation of the converter 100 and controlling operation of the converter 100 based on the developed operational models. The methods of the present disclosure utilize 100% real time on-line measurement of attributes of the glass tubes 102 and/or glass articles 103, virtual part tracking, and statistical data analysis tools to automatically develop operational models of the converter and automatically determine run settings from the operational models. In particular, the methods of the present disclosure may include developing a plurality of condition sets for the converter, where each condition set comprises settings for a plurality of process parameters. Each condition set is unique. The converter is then operated at each of the conditions sets to produce glass articles 103. While producing the glass articles 103, various attributes of the glass articles 103, glass tubes 102, or both are measured in real time by the measurement devices 360 of the converter 100. Each glass article 103 may be assigned a unique identifier, which may be associated with the condition set used to make the glass article 103 and the attributes measured for the glass article. Once all of the condition sets have been run, the data on the condition sets and measured attributes can then be used to develop one or a plurality of operational models that correlate one or more of the process settings on the converter 100 to the attributes measured. The operational models may be used to automatically determine run settings for each of the plurality of process parameters of the converter 100.

The systems and methods of the present disclosure may provide an alternative to the current state of the art in that the systems and methods of the present disclosure work to reduce or eliminate the operator from the complex decision trees involved in initially setting up the converting process and making day-to-day and hour-to-hour adjustments to the converter 100 in response to changing conditions. The systems and methods of the present disclosure enable a statistics-based converter setup approach that is independent of experience and skill level of the human operators working on the converter 100. Once the operational models have been developed and the best run settings determined from the model, automation software within the control system for the converter 100 can drive the burners, control valves, servo motors, and other control equipment to those run settings. Thus, the systems and methods of the present disclosure can enable the full potential of the increased capital cost of mass flow controllers, servo motor controlled forming heads, PLC's, online inspection systems, and databases to be realized in several ways. The systems and methods of the present disclosure may further reduce yield loss resulting from start-ups and changeovers; upset conditions such as maintenance or replacement of one or more components of the converter 100; changes in operating conditions or external inputs; or combinations of these. The systems and methods may also enable adjustment to be made to operation of the converter 100 to account for normal process variability in a consistent and data driven manner rather than through guesswork and human assumptions.

Referring again to FIG. 1, a system 400 for producing a plurality of glass articles from glass tube 102 may include the converter 100 having the plurality of processing stations 106, such as but not limited to at least one heating station 202, at least one forming station 204, and a separating station 206. The converter 100 may be operable to move or pass the glass tube 102 through each of the plurality of processing stations 106. The converter 100 may include the plurality of holders 130. Each of the plurality of holders 130 may be operable to secure a glass tube 102 and rotate the glass tube 102 about the center axis D of the glass tube 102. The converter 100 is operable to translate the glass tubes 102 in each of the plurality of holders 130 through the plurality of processing stations 106. The converter 100 may additionally include at least one measurement device 360 operable to measure one or more attributes of each of the glass articles 103 produced from the glass tube 102. The converter 100 may further include a control system 402 communicatively coupled to the converter 100. It is understood and intended that the converter 100 may include any of the features, processing stations, or operating parameters previously described herein for converter 100.

Referring again to FIG. 9, as previously discussed, the system 400 may include one or a plurality of measurement devices 360. The measurement devices 360 may enable 100% online inspection of various dimensions and cosmetic attributes of the glass tube 102, glass articles 103, or both to provide real time feedback to the system 400. The measurement devices 360 may be disposed in one or a plurality of the measuring stations 218, which may be in the primary circuit, the secondary circuit, or both. Additionally or alternatively, in embodiments, the converter 100 may include one or a plurality of measurement devices 360 positioned at one or more processing stations 106 that are not a measuring station 218, such as but not limited to a heating station 202, forming station 204, separating station 206, cooling station, piercing station, or other type of processing station. Additionally or alternatively, one or more of the measurement devices 360 may be coupled to one of the plurality of holders 130 and may be translated through a plurality of the processing stations 106 with the holder 130. In embodiments, the converter 100 may include a plurality of measurement devices 360, each of which may be coupled to one of the plurality of holders 130 to be translated through the plurality of processing stations 106 with the holder 130 and glass tube 102. Additionally or alternatively, the measurement devices 360 may be disposed downstream of the converter 100, such as at a quality control station downstream from the converter 100.

The measurement devices 360 may be operable to measure one or a plurality of attributes of the glass tube 102, one or a plurality of attributes of each of the glass articles 103 produced from the glass tubes 102, or a combination of these. The attributes of the plurality of glass tubes 102, glass articles 103, or both may comprise one or more temperatures of the glass tube 102, one or more dimensions of the glass tube 102, one or more dimensions of the plurality of glass articles 103, one or more cosmetic attributes of the plurality of glass articles 103, or combinations of these. In embodiments, the measurement device 360 may be positioned and operable to measure one or more attributes of a glass preform at the working end 150 of the glass tubes 102. The glass preform refers to the heated portions of the glass tube 102 at the working end 150 of the glass tube 102 after the heating stations 202 and before the forming stations 204. In other words, the glass preform refers to the working end 150 of the glass tube 102 that is in a suitable condition (e.g., glass viscosity) for forming. Since the glass preform is part of the glass tube 102 during converting, reference to attributes of the glass tube 102 herein is intended to include attributes of the glass preform. The attributes of the glass preform may include glass temperature, dimensions of the preform, other attributes of the preform, or combinations of these. Other attributes of the glass tubes 102, glass articles 103, or both may also be measured and are contemplated by the present disclosure.

The one or more measurement devices 360 may include any measurement devices capable of measuring one or more dimensions, temperatures, or cosmetic attributes of the glass tube 102 and/or glass articles 103 made therefrom. Measurement devices 360 may include but are not limited to optical measuring systems, laser measurement devices, measurement devices using sound waves or other electromagnetic waves, or other measurement technology. In embodiments, the measurement devices 360 may include a thermal imaging system, such as the thermal imaging systems disclosed in U.S. Pat. No. 10,773,989, entitled "SYSTEMS AND METHODS FOR MEASURING THE TEMPERATURE OF GLASS DURING TUBE CONVERSION," filed on Mar. 22, 2018, the entire contents of which are incorporated by references herein in their entirety. The thermal imaging systems may be operable to measure one or more temperatures or dimensions of the glass tube 102, glass article 103, or both during or after heating and forming the glass tube 102 into the glass articles 103. Additionally or alternatively, the measurement devices 360 may include one or more dimension measuring systems, such as one or more of a visual imaging system, a laser reflectometer, a laser gauge, an optical micrometer, or other measuring device operable to measure one or more dimensions of the glass tube 102, glass article 103, or both. Other available measurement devices 360 for determining one or more temperatures, dimensions, cosmetic attributes, or combinations of these of the glass tube 102, the glass articles 103, or both are contemplated.

Referring again to FIG. 1, the system 400 for producing a plurality of glass articles from glass tube 102 may further include the control system 402 communicatively coupled to the converter 100. In particular, the control system 402 may be communicatively coupled to the measurements devices 360 and to one or a plurality of control devices in one or more of the processing stations 106 of the converter 100. Control devices of the converter 100 that may be communicatively coupled to the control system 402 may include but are not limited to burner positioners 318, fuel gas control valves 310, oxygen control valves 312, air control valves 314, forming tool actuators 326, cooling fluid control valves 344, main turret drive motor, drive motor(s) operatively coupled to the holders 130 for rotation of the glass tubes 102, timers, vent systems, other control devices, or combinations of these. The number and type of control devices may depend on the specific converter 100 being used and the number and type of processing stations 106 employed by the converter 100.

The control system 402 may include one or a plurality of processors 404, one or a plurality of memory modules 406 communicatively coupled to the processor(s) 404, and machine readable and executable instructions 408 stored on the one or a plurality of memory modules 406. The machine readable and executable instructions 408, when executed by the processor(s) 404, may cause the system to automatically perform any of the actions and/or methods steps further described in greater detail herein, even if not explicitly described in the context of the machine readable and executable instructions 408.

In particular, the machine readable and executable instructions 408, when executed by the processor(s) 404, may cause the system to automatically operate the converter 100 to convert the glass tubes 102 into a plurality of glass articles 103; measure one or more attributes of the plurality of glass tubes 102, glass articles 103, or both using the at least one measurement device 360; adjust a plurality of process parameters of the converter 100 to run the converter 100 at each of a plurality of condition sets; associate each of the plurality of glass articles 103 with one of the plurality of condition sets that is used to produce the glass article 103 and the one or more attributes of the glass tubes 102, glass articles 103, or both measured by the measurement device(s) 360; and develop one or more operational models based on the attributes measured and the condition sets. Each of the operational models may relate one or more of the plurality of process parameters to the one or more measured attributes of the glass tube 102, glass article 103, or both. The machine readable and executable instructions 408, when executed by the one or more processors 404, may further cause the control system 402 to automatically determine a run setting for each of the process parameters based on the operational models and operate the converter 100 with each of the process parameters set to the run setting determined from the operational models.

The plurality of conditions sets of the converter 100 may each include a plurality of settings for the plurality of process parameters of the converter 100. Each of the plurality of condition sets of the converter 100 may be different from every other condition set. Thus, each condition set may represent a unique group of settings for the process parameters of the converter 100. In some instances, such as with a forming tool change, many of the process parameters may remain the same and only a subset of the condition sets is needed to re-tune the converter 100, where the subset of the condition sets includes a number of conditions sets less than the total number of conditions sets possible for the converter 100.

The plurality of process parameters in each condition set may include, but are not limited to, an overall part rate, a holder 130 rotation rate, burner positions in one or a plurality of heating stations 202, burner heat outputs in one or a plurality of heating stations 202, positions of forming tools 324 in one or a plurality of the forming stations 204, contact timing (i.e., total contact time, contact sequence, or both) between forming tools 324 and the glass tube 102 in one or more forming stations 204, contact sequence of the forming tools 324 with the glass tube 102, other operating parameter, or combinations of these. Referring to FIG. 3, the burner positions of the burners 302 in the heating stations 202 may include vertical position (e.g., +/−Z direction of the coordinate axis in FIG. 3), horizontal position (e.g. position in the X-Y plane of the coordinate axis in FIG. 3), or combinations of these of the burners 302 relative to the glass tube 102. Burner heat outputs of the burners 302 in the heating stations 202 may include positions of one or more of the fuel gas control valve 310, oxygen control valve 312, air control valve 314, or combinations of these, which may control the burner heat output of the burners 302.

Referring to FIG. 4, the forming tool positions of the forming tools 324 in the forming stations 204 may include vertical position (e.g., +/−Z direction of the coordinate axis in FIG. 3), horizontal position (e.g. position in the X-Y plane of the coordinate axis in FIG. 3), or combinations of these of the forming tools 324 relative to the glass tube 102. The horizontal positioning of the forming tools 324 may refer to the horizontal position of the forming tools 324 in the engagement position. When in the engagement position, the horizontal positioning of the forming tools 324 may determine the pressure of the forming tools 324 against the glass tube 102. Contact timing between the forming tools 324 and the glass tube 102 may be controlled by controlling operation of the forming tool actuators 326 to adjust the timing of moving the forming tools 324 into and out of engagement with the glass tube 102 in the forming stations 204. As previously discussed, the contact timing can be adjusted to control the total contact time, contact sequence, or both in a forming station 204.

Discussion herein of certain process parameters associated with heating stations 202 and forming stations 204 is provided for purposes of illustrating the subject matter of the present disclosure and is not intended to limit the process parameters that may be used. It is understood that other process parameters associated with the separation station 206, piercing station, cooling stations, or other processing stations 106 of the converter 100 may also be included in the condition sets. The number and type of process parameters in each condition set of the converter 100 may depend on the type of converter 100, such as the number and type of processing stations 106 on the converter 100, the configurations of each of the processing stations 106, the process control devices (e.g., control valves, motorized adjustments, speed regulators, etc.) present on each of the processing stations 106, or other factors.

Each of the process parameters of the converter 100 may have a range of settings. The range of settings for each of the process parameters may be representative of the full range of control of the process parameter or may be a narrower range of settings, over which the converter 100 may be expected to produce the glass articles having acceptable quality and yield. The range of settings for each of the process parameters may be used to develop the plurality of condition sets of the converter 100. In embodiments, the range of settings for each of the process parameters of the converter 100 may be input into a Design of Experiments statistical software program, which may be operable to process the range of settings for each of the process parameters of the converter 100 to develop the plurality of condition sets. An example of a Design of Experiments statistical software program may be JMP® developed by SAS. Other commercially-available statistical software packages or custom built software and/or algorithms may also be used for developing the plurality of condition sets. The plurality of conditions sets provides a set of "recipes" for operation of the converter 100. Illustrative examples of subsets of condition sets are provided in Tables 2 and 3 of the Examples.

In embodiments, a starting recipe may be provided or stored in one or more memory modules of the control system 400 of the converter 100. The starting recipe may be associated with a particular type or size of glass article 103 and may include preset values for each of the process parameters for the converter 100. The conditions sets may be developed the starting recipe by selecting settings for each of the process parameters that are centered about the preset values from the starting recipe or distributed throughout a range of values that includes the preset value from the starting recipe. In other words, the condition sets may include the preset value from the starting recipe for a particular process parameter as well as values for the process parameter on either side of the preset value.

Once the conditions sets are developed for the converter 100, the control system 400 may operate the converter 100 at each of the plurality of condition sets. In particular, the machine readable and executable instructions 408, when executed by the processor(s) 404, may cause the system 400 to automatically operate the converter 100 to convert the glass tubes 102 into a plurality of glass articles 103 and adjust a plurality of process parameters of the converter 100 to run the converter 100 at each of a plurality of condition sets. The condition sets may be uploaded to the control system 402 and stored in the one or more memory modules 406. The control system 400 may be operable to produce a fixed number of glass articles 103 at the process parameters for each condition set. As few as 60 glass articles, or even 50 glass articles, can show statistical significance between condition sets. The control system 400 may be operable to produce greater than or equal to 50 or greater than or equal to 60 glass articles 103 at the process parameters of each condition set of the converter 100. In embodiments, the control system 400 may be operable to produce from 50 to 200, from 50 to 100, from 60 to 200, or from 60 to 100 glass articles 103 for each condition set of the converter 100.

While operating the converter 100 to produce glass articles 103 at the process parameters in each of the conditions sets, the machine readable and executable instructions 408, when executed by the processor(s) 404, may cause the system 400 to automatically measure one or more attributes of the plurality of glass tubes 102, glass articles 103, or both using the measurement device(s) 360. As previously discussed, the measuring devices 360 may be operable to measure one or more attributes of the plurality of glass tubes 102, glass articles 103, or both. The attributes may include but are not limited to one or more temperatures or dimensions of the glass tube 102 or glass preform, one or more dimensions of the glass articles 103, one or more cosmetic features of the glass articles 103, or combinations of these.

The measurement devices 360 may be communicatively coupled to the control system 402. The measurement devices 360 may be operable to transmit one or more signals to the control system 402 indicative of the attributes of the glass tube 102, glass articles 103, or both measured by the measurement devices 360.

The control system 402 may receive the signals indicative of the measured attributes of the glass tube 102, glass articles 103, or both and may determine the one or more measured attributes from the signals. The control system 402 may include virtual part tracking software that may assign each glass article 103 a unique and discrete part number as it is created and translated through the processing stations 106 and measurement devices 360. In particular, the machine readable and executable instructions 408, when executed by the one or more processors 404, may cause the control system 402 to automatically assign a unique identifier to each of the plurality of glass articles 103 as it is produced on the converter 100. The unique identifier may be a serial number or a sequential part number assigned to each glass article 103. The control system 402 may be operable to track each of the plurality of glass articles 103 produced through the converter 100 by the unique identifier. The machine readable and executable instructions 408, when executed by the one or more processors 404, may cause the control system 402 to automatically associate the unique identifier of each of the plurality of glass articles 103 with the condition set used to produce the glass article 103 and the one or more attributes measured for the glass article 103. In embodiments, the control system 402 may further include a relational database stored on the one or more memory modules 406. The machine readable and executable instructions 408, when executed by the one or more processors 402, may cause the control system 402 to automatically store the unique identifier, the condition set, and the one or more attributes measured for each glass article 103 in the relational database. The unique identifier may be associated with other manufacturing information about the glass article, such as but not limited to the location and time of manufacturing the glass article, the lot number, starting glass tube information, or other manufacturing and/or distribution information relating to the glass article.

Once all the condition sets have been run on the converter 100, the control system 402 may be operable to develop one or a plurality of operational models for the converter 100. In particular, the machine readable and executable instructions 408, when executed by the one or more processors 402, may cause the control system 402 to automatically develop one or more operational models based on the one or more attributes measured and the plurality of condition sets. The operational models may relate the various process settings to the one or more attributes of the glass articles 103. The operational models may be mathematical or empirical models relating the process settings to the measured attributes of the glass articles 103.

Figure 11:
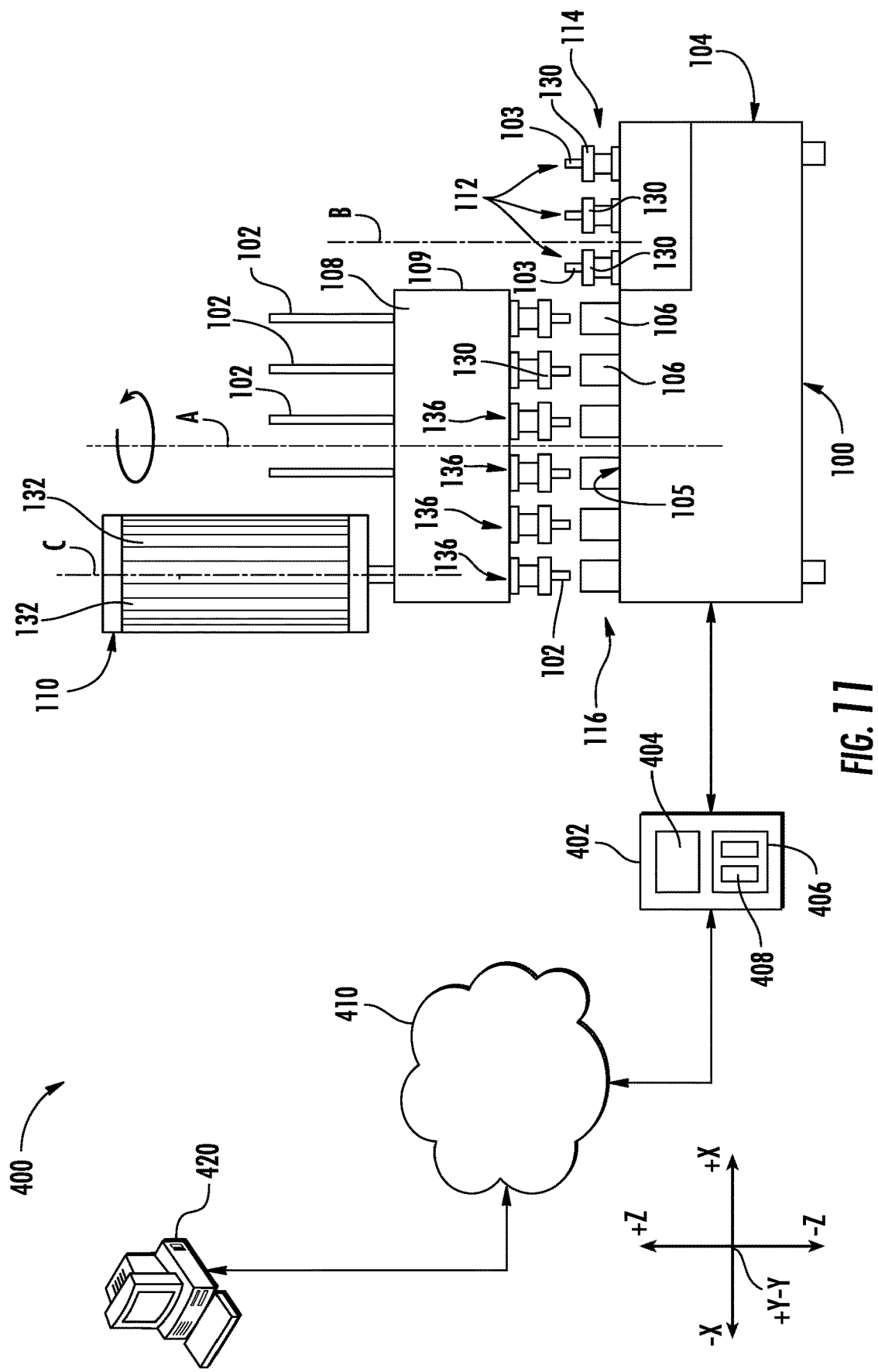
FIG. 11 schematically depicts another embodiment of a system comprising a converter for converting producing glass articles from glass tubes, according to one or more embodiments shown and described herein.

The operational models may be generated through statistical analysis of the data collected on the measured attributes of the glass articles 103 and the process parameters utilized to produce the glass articles 103. In embodiments, the operational models may be developed externally from the control system 402. Referring to FIG. 11, the data collected on the measured attributes of the glass articles 103 and the process parameters used to produce the glass articles 103 may be exported from the control system 402 to an external computing device 420. The data may be exported from the control system 402 to the external computing device 420 through a network 410, which may be a wired or wireless network. The external computing device 420 may comprise a statistical analysis software capable of processing the data received from the control system 402 and developing the operational models therefrom. An example of a statistical analysis software may include JMP® developed by SAS; however, other statistical analysis software packages may be used. Once developed, the operational models may be transmitted from the external computing device 420 to the control system 402 for use in operation of the converter 100.

Additionally or alternatively, in embodiments, control system 402 may be programmed to develop the operational models from the data on the condition sets and measured attributes. In particular, the control system 402 may include machine readable and executable instructions 408 that, when executed by the processors 404, may cause the control system 402 to process the data on the condition sets and measured attributes to develop one or a plurality of the operational models for the converter 100. The data may be processed by the control system 402 through statistical analysis programming and instructions.

Following development of the operational models, the control system 402 may be operable to determine a run setting for each of the process parameters using the operational models and then to operate the converter 100 at the run settings. The control system 402 may be operable to receive a specification for the glass articles 103 to be produced, where the specification may include one or a plurality of target dimensions, one or a plurality of target cosmetic attributes, or combinations of these for the glass articles 103 to be produced. The machine readable and executable instructions 408, when executed by the processors 404, may cause the control system 402 to automatically receive the specification for the glass articles 103 to be produced and determine the run settings for each of the process parameters of the converter 100 from the specification and the operational models developed for the converter 100. The control system 402 may receive the specification for the glass articles 103 from a user input device or from the external computing device 420 communicatively coupled to the control system 402 through the network 410. The run settings for the process parameters may be determined by entering the values for the attributes of the glass article 103 from the specification into the operational models and calculating the run settings therefrom. Operating the converter 100 at the run settings may include adjusting each of the process parameters to the run settings determined from the operational models.

Referring to FIG. 1, the system 400 of the present disclosure may be utilized in a method of producing glass articles 103 from glass tubes 102. The methods disclosed herein for controlling the converter 100 for converting the glass tubes 102 into glass articles 102 may include preparing the plurality of condition sets for the converter 100, wherein each condition set comprises settings for the plurality of process parameters of the converter 100. The methods may include operating the converter 100 to convert the glass tube 102 into a plurality of glass articles 103 by translating the glass tube 102 through the plurality of processing stations 106 of the converter 100 and measuring one or more attributes of the plurality of glass tubes 102, glass articles 103, or both during or after processing in processing stations 106. The methods may include adjusting one or more of the plurality of process parameters to run the converter 100 at each of the condition sets and associating each of the plurality of glass articles 103 with the condition set used to produce the glass article 103 and the attributes measured for the glass tube 102, glass article 103, or both, during or after converting. The methods may further include developing the one or plurality of operational models based on the attributes measured and the plurality of condition sets for each of the plurality of glass articles 103. The one or plurality of operational models may relate one or more of the plurality of process parameters to the one or more measured attributes of the glass tubes 102, glass articles 103, or both. The methods may further include determining a run setting for each of the plurality of process parameters based on the operational models and operating the converter 100 with each of the plurality of process parameters set to the run setting determined from the operational models.

In the methods of the present disclosure, the attributes of the glass tubes 102, glass articles 103, or both may be any of the attributes previously described herein. Additionally, the plurality of process parameters of the converter 100 in each condition set may include, but are not limited to, any of the process parameters of the converter 100 discussed herein. In embodiments of the methods disclosed herein, associating each of the plurality of glass articles with the condition set and the attributes measured for the glass tube 102, glass article 103, or both may include assigning a unique identifier to each of the plurality of glass articles 103 as it is produced, tracking each of the plurality of glass articles 103 produced through the converter 100 by the unique identifier, and associating the unique identifier of each of the plurality of glass articles 103 with the condition set used to produce the glass article 103 and the attributes measured for the glass article 103 and/or glass tube 102 from which the glass article 103 was produced. In embodiments, the unique identifier of each of the plurality of glass articles 103 may be associated with the condition set and the one or more measured attributes through a relational database.

The systems 400 and methods of the present disclosure for controlling operation of the converter 100 may be used to quickly and efficiently achieve or return to steady state operation of the converter 100 for producing high quality and high yield of the glass articles 103 in response to several different situations. The systems 400 and methods of the present disclosure may be used to control operation of the converter 100 to quickly and efficiently achieve steady state operation of the converter 100 during start-up of a new converter 100, start-up of a new type or size of glass article 103 on an existing converter 100, changeover from one type or size of glass article 103 to another type or size of glass article 103, or combinations of these. The systems 400 and methods of the present disclosure may be used to control operation of the converter 100 to quickly and efficiently re-tune operation of the converter 100 following a change in one or more components of the converter 100, such as forming tools 324 or burners 302; changes in one or a plurality of external inputs to the converter 100, or combinations of these. The systems 400 and methods may also be used to continually evaluate and modify the operational models during steady state operation to account for long term trends in operation of the converter 100. The systems 400 and methods may also enable identification of upset conditions on the converter 100, such as malfunctioning equipment (e.g., burners 302, forming tools 324, holders 130, etc.), missing glass tubes 102, wrong size glass tubes 102, or other upset condition that may not be readily and immediately identifiable to a human operator during operation of the converter 100.

Converter Start-Up/Changeover

Referring again to FIG. 1, the systems 400 and methods of the present disclosure may be used to control operation of the converter 100 to quickly and efficiently achieve steady state operation at start-up or following a changeover of the converter 100. Start-up may refer to initially beginning operation of a new converter 100 or beginning operation of an existing converter 100 to produce a new type or size of glass articles 103 that has not previously been produced on the existing converter 100. Changeover may refer to changing the size or type of glass article 103 from one previously produced size/type of glass article 103 to another previously produced size/type of glass article 103. Changeover may also include a change in the dimensions of the glass tube 102 used to produce the glass articles 103. As previously discussed, changes in the type or size of glass article being produced typically can involve considerable lost production time resulting from setting and adjusting the hundreds of process settings on the converting machine for the new type or size of glass article.

Developing the setup for a new converter 100 or for a new glass article 103 that has not been previously produced can be a relatively long and iterative process that is heavily reliant on the human operators to execute. In particular, a burner setup of the converter 100 is typically conducted first to produce the proper preform at the working end 150 of the glass tube 102, and then a forming station 204 setup is conducted to produce the final glass article 103. During the burner setup phase, the part rate of the converter 100, burner 302 positions, and burner 302 heat outputs may be adjusted in sequence moving around the converter 100 from the separation station 206 to the last heating station 202 before forming. These adjustments during burner setup can be based on general guidelines and targets for various dimensions of the glass tube 102, which can help gauge the impact of these individual burner 102 parameters as well as their interactions with each other. However, for the most part, burner setup involves an iterative process to create an appropriate glass preform for forming to take place.

Once the glass preform shape has been developed, a setup for the forming stations 204 is then developed. The relative vertical and horizontal positioning of the forming tool 324 influences the shape of the features of the glass articles 103. For a glass vial, these features can include shoulder angle, top height, flange height, neck outer diameter, or other features. The features and shapes depend on the type of glass article 103 being produced. General guidelines and targets for these various shapes and dimensions exist; however, to meet the demanding dimensional tolerances for pharmaceutical glass articles, significant iteration time may be needed to find the appropriate forming setup, which may often include going backwards in the process to make further modifications to the burner setup.

Skilled and experienced human operators can require one to two days, or even more, to adjust the converting machine to the new glass article and achieve acceptable product yields and quality, and this time can increase to weeks for new types or sizes of glass articles 103 not previously produced. Prolonged setup times when changing from one type or size of glass article 103 to another or starting up a new glass article 103 or converter can result in high yield loss for the converting process.

The systems 400 and methods of the present disclosure provide an alternative to this standard operator-driven iterative approach for startup of the converter 100. As previously discussed, the systems 400 and methods of the present disclosure include systematically operating the converter 100 at the plurality of condition sets and developing operational models based on the condition sets and the measured attributes of the glass tubes 102, glass articles 103, or both produced using the condition sets. The operational models developed for the converter 100 for the specific glass article 103 being produced can then be used to determine the run settings for the converter 100 in order to produce the glass articles 103 having the desired attributes. This provides a systematic and automatic setup process that reduces or eliminates dependence on machine operator decision-making and accelerates the converter 100 setup and changeover process.

The system 400 may receive an input indicative of a change in a type of glass article 103 produced by the converter 100 from a first glass article to a second glass article. The change in the type of the glass article 103 may comprises a change in size, shape, or both of the glass article 103, glass tube 102, or both. In embodiments, the second glass article may be a new type or size of glass article 103 not previously produced on the converter 100. The input indicative of a change in the type of glass article 103 may be a manual input or may be an electronic signal received from an external system. In embodiments, the electronic signal may include a starting recipe for the second glass article, where the plurality of conditions sets may be developed beginning with the starting recipe. The system 400 may operate the converter 100 to convert the glass tubes 102 into the plurality of second glass articles, measure one or more attributes of the plurality of second glass articles using the measurement device 360, adjust the plurality of process parameters to run the converter 100 at each of the plurality of condition sets, associate each of the plurality of second glass articles with the condition set used to produce the second glass article and attributes measured, and develop one or more operational models for the second glass article based on the one or more measured attributes and the plurality of condition sets for each of the plurality of second glass articles. The system 400 may further determine a run setting for each of the plurality of process parameters based on the one or more second operational models and operate the converter 100 with each of the plurality of process parameters set to the run setting determined from the one or more second operational models. Although described in the context of a changeover from a first glass article to a second glass article, the systems 400 and methods of this paragraph can be equally applied to startup of a new converter 100 (e.g., setup of the first glass article on a new machine).

In embodiments, the converter 100 may be setup in stages. A first stage of the setup may be the burner setup for determining the settings for process parameters for the heating stations 202 to produce a glass preform having target attributes, such as temperature, viscosity, dimensions, or combinations of these. Once the converter 100 has been set up to produce the proper glass preform at the working end 150 of the glass tube 102, the second stage of the setup may be a forming setup for determining the settings for the process parameters of the forming stations 214 for forming the glass preform into features of the glass articles 103.

The methods of the present disclosure may include the following steps, which may be implemented by the system through execution of the machine readable and executable instructions 408 by the processors 404. The methods may include preparing a first subset of condition sets that may include process parameters relating to producing the glass preform at the working end 150 of the glass tube 102 in one or more heating stations 202. The method may further include preparing a second subset of conditions sets that may include process parameters relating to forming the glass preform into one or more features of the glass article 103 at the working end 150 of the glass tube 102 in one or more forming stations 204. The conditions sets may be developed according to any of the methods disclosed herein, such as but not limited to inputting the various process parameters into a Design of Experiments statiscal software program. In embodiment, the first subset of condition sets and the second subset of condition sets can be developed external to the system 400 and then uploaded to the control system 402 as "recipes" that the control system 402 can then automatically run through on the converter 100.

The methods may further include operating the converter 100 at each condition set in the first subset of conditions sets, measuring one or more preform attributes of the glass preform at the working end 150 of the glass tube 102, and developing one or more preform operational models based on the one or more preform attributes measured and the first subset of condition sets. The preform operational models may be developed according to any of the methods disclosed herein for developing the operational models. The preform operational models may describe the relationship of the various burner input parameters (burner flow, position, and holder 130 rotation rate), to attributes of the glass preform, such as one or more dimensions and/or temperature profile of the glass preform. The methods may further include determining run settings for each of the plurality of process parameters in the heating stations 202 based on the preform operational models and operating the converter 100 with each of the plurality of process parameters of the heating stations 202 set to the run settings determined from the preform operational models.

In embodiments, the preform operational models may be developed using an external computing system 420 (FIG. 11) outside of the control system 402 using a statistical software program such as JMP® or other statistical software. Once developed by the external computing system 420, the preform operational models may be used to determine the best run settings for the heating stations 202 and the run settings can be uploaded to the control system 402 as a recipe. In embodiments, the preform operational models may be developed internally within the control system 402. The control system 402 may include machine readable and executable instructions that, when executed by the processors 404, may cause the control system to conduct statistical analysis of the condition sets and measured attributes of the glass preform to develop the preform operational models. The machine readable and executable instructions, when executed by the processors 404, may further cause the control system 402 to automatically determine the run settings for the heating stations 202 from the preform operational models and automatically adjust the process parameters for the heating stations to the run settings developed from the preform operational models.

Once the proper glass preform has been setup, a similar process may be conducted for the forming setup to determine the run settings for the plurality of forming stations 204. The methods of the present disclosure may further include, while operating the converter 100 with the process parameters of the heating stations 202 set to the run settings, operating the converter 100 at each condition set in the second sub set of condition sets, which include process parameters relating to the forming stations 204. The methods may further include measuring the one or more attributes of the plurality of glass articles 103 produced, developing one or more forming operational models based on the attributes measured for the plurality of glass articles 103 and the second subset of condition sets, determining run settings for each of the plurality of process parameters in the forming stations 204 based on the one or more forming operational models, and operating the converter 100 with each of the plurality of process parameters of the forming stations 204 set to the run settings determined from the one or more forming operational models. As with the preform operational models, the forming operational models may be developed on the external computing system 420 or internally on the control system 402.

Component Replacement

The systems 400 and methods disclosed herein may enable automatic re-tuning of the converter 100 following replacement of one or more components in one or more processing stations 106 of the converter 100. High yield loss can result from replacing one or more components of the converter 100, such as but not limited to burners 302, control valves, forming tools 324, actuators, positioners, etc. Following replacement of components in one or a plurality of processing stations 106, the existing run settings for one or more of the process parameters may no longer result in producing glass articles 103 meeting quality specifications and may need to be adjusted. For instance, following replacement of one or more forming tools 324 in a forming station 204 due to wear or malfunction of the forming tools 324, the positioning of the new forming tools 324 may need to be adjusted due to the different dimensions of the replacement forming tool 324 compared to the worn forming tool 324. These adjustments are often difficult for human operators to manage. Incorrect adjustements can often make yield upsets worse and more prolonged following a component replacement.

The systems 400 and methods of the present disclosure enable systematic and automatic re-tuning of the converter 100 following replacement of one or more components of the converter 100 or other upset condition of the converter 100. The following method steps relating to automatic re-tuning of the converter 100 after a component change will be described in the context of replacement of a forming tool(s) 324. However, it is understood that the method steps may be utilized to similar effect in re-tuning the converter 100 following replacement of any other components, such as but not limited to burners 302, burner positioners 318, control valves (fuel gas control valve, oxygen control valve, air control valve), forming tool actuators 326, holders 130, or other component.

The methods disclosed herein for automatic re-tuning of the converter 100 following replacement of a component of the converter 100 may include identifying one or more defective components in one or more processing stations 106 of the converter 100. Defective components may refer to components that have malfunctioned or have worn so that they no longer produce glass articles 103 meeting dimensional and/or cosmetic standards for the glass articles 103. The methods may further include replacing the defective component in the one or more processing stations 106 with one or more replacement components. The defective components may be any of the components in any of the processing stations 106 described previously herein. In embodiments, the method may include identifying one or more defective forming tools in one or more forming stations 204 of the converter 100. Defective forming tools may refer to forming tools 324 that no longer produce glass articles 103 meeting dimensional standards for the glass articles 103. The defective forming tools may be worn or damaged. The methods may further include replacing the defective forming tool(s) with one or more replacement forming tools.

Following replacement of the defective component with a replacement component, the methods may further include preparing the plurality of conditions sets for the converter 100, operating the converter 100 to convert the glass tube 102 into a plurality of glass articles 103, measuring one or more attributes of the plurality of glass articles 103, the glass tube 102, or both, adjusting one or more of the plurality of process parameters of the condition sets to run the converter 100 at each of the plurality of condition sets, and associating each of the plurality of glass articles 103 with the condition set used to produce the glass article 103 and the one or more attributes measured. The methods may further include updating the operational models based on the one or more attributes measured and the plurality of condition sets for each of the plurality of glass articles 103 to produce a set of updated operational models taking into account the replacement components. The run settings for each of the plurality of process parameters may be determined from the updated operational models. The process parameters may be adjusted to the run settings and the converter 100 operated at the new run settings to produce glass articles 103.

In embodiments, replacement of a component, such as a forming tool 324, may not need adjustments to all of the process parameters of the converter 100 to automatically re-tune the converter 100. For instance, a forming tool 324 replacement may not affect the glass preform and the process parameters associated with the upstream heating stations 202 may not need to be re-tuned. Thus, automatic re-tuning of the converter 100 following a component replacement may only need adjustments to a subset of the process parameters for the converter 100. In embodiments, the plurality of conditions sets of the converter 100 may include settings for a subset of the plurality of process parameters of the converter 100. The subset of process parameters may include process parameters relating to the processing station 106 for which the component has been replaced and, optionally, any processing stations 106 downstream thereof. In embodiments, the component replacement may be a forming tool replacement, and the subset of the plurality of process parameters of the converter 100 may include positioning (with respect to all three dimensions of the coordinate axis in the Figures) of the one or more replacement forming tools, a contact timing of the one or more replacement forming tools with the glass tube 102, or both. The contact timing of the the forming tools 324 with the glass tube 102 may be adjusted by adjusting the timing of actuating the forming tools 324 into and/or out of engagement with the glass tube 102. The contact timing may include the total contact time of the replacement forming tools in contact with the glass tube 102, the contact sequence of engagement and/or disengagement of the replacement forming tools from the glass tube 102, or both.

In embodiments, the methods for automatic re-tuning of the converter 100 following a component replacement or other machine upset may be conducted using the system 400 comprising the control system 402. The system 400 may include machine readable and executable instructions 408 that, when executed by the processors 404, may further cause the control system 402 to automatically receive an input indicative of a change in one or more components in the at least one processing station 106 of the converter and develop a subset of condition sets. The subset of condition sets may include settings for a subset of process parameters of the converter 100 relating to or affected by the change in the component of the converter 100. In embodiments, the component change may be a replacement of one or more forming tools 324 and the subset of condition sets may include settings for a subset of process parameters relating to the forming station 204 for which the forming tools were replaced and/or process parameters relating to processing stations 106 downstream of the forming station 204.

The machine readable and executable instructions 408, when executed by the processor(s) 404, may further cause the control system to operate the converter 100 to convert the glass tubes 102 into the plurality of glass articles 103, measure the one or more attributes of the plurality of glass articles 103, glass tube 102, or both using the at least one measurement device 360, adjust one or more of the plurality of process parameters to run the converter 100 at each of the condition sets in the subset of condition sets, associate each of the plurality of glass articles 103 with the condition set used to produce the glass article 103 and the attributes measured for each glass article 103, and update one or more of the operational models based on the attributes measured and the subset of condition sets for each of the plurality of glass articles 103 to produce one or more updated operational models for the converter 100. The updated operational models may be used by the control system 402 to determine run settings for the plurality of process parameters. The control system 402 may then operate the converter 100 with the process parameters set to the run setting determined from the operational models.

Continuous Converter Control

As previously discussed, the systems 400 and methods of the present disclosure can also enable continuous monitoring of the process parameters during steady state operation of the converter 100 and adjustment of the converter 100 operation in response to sudden or longterm changes in the converter 100 or external inputs to the converter 100, such as changes in the environment in which the converter 100 operates. Variability can occur with incoming mass of the glass tubing 102, thermal growth of the main turret 108 over time, wear of forming tools 324, wear of burners 302 overtime, or other internal and external changes of the converter 100. The process variability introduced by these internal and external factors can manifest as gradual shifts or trends in the attributes (e.g., dimensions, cosmetic attributes, or both) of the glass articles 103. The response of human operators to these changing attributes can significantly impact "steady state" yields. By applying machine learning principles to the relational data derived from steady state production data and combining that analysis with automation scripts, adjustments can be made to the converting process to account for process variability in a consistent and data driven way, which may reduce or prevent "steady state" yield loss attributable to operator errors.

The system 400 may be operable to continuously or periodically compare the attributes of the glass article 103 and/or glass tube 102 measured by the measuring device(s) 360 to predicted attributes of the glass article 103 and/or glass tube 102 determined from the run settings and the operational models. The comparison may enable identification of trends in measured attributes of the glass articles 103 and/or glass tubes 102 or trends in changing internal or external factors relating to the converter 100. In embodiments, the machine readable and executable instructions 408, when executed by the one or more processors 404, may cause the control system 402 to automatically measure the one or more attributes for each of the plurality of glass articles 103, glass tubes 102, or both while operating the converter with each of the plurality of process parameters set to the run settings; determine one or more predicted attributes for each of the plurality of glass articles 103, glass tubes, or both from the plurality of process settings and the one or more operational models; compare the one or more attributes measured for each of the plurality of glass articles 103 to one or more predicted attributes; and identify a deviation from normal operating conditions based on the comparison.

The comparison of measured attributes to predicted attributes may be conducted periodically or at specific time intervals during steady state operation of the converter 100. In embodiments, the control system 402 may be operable to continuously collect and save information on the run settings, measured attributes, predicted attributes, or combinations of these for each of the glass articles 103 produced and may associate these values with the unique identifier for each of the glass articles 103 produced. In this context, the term "continuously" refers to determining the run settings, measured attributes, and/or predicted attributes for each glass article 103 produced. The term "periodic" refers to determining the run settings, measured attributes, and/or predicted attributes for less than each and every glass article 103, such as every other glass article 103, one glass article 103 per revolution of the main turret 108, one glass article 103 per length of glass tube 102, every tenth glass article 103, every one hundredth glass article 103, every one thousandth glass article 103, or other frequency. The control system 402 may be operable to save the data on the run settings, measured attributes, predicted attributes, or combinations of these in the one or more memory modules 406 or may be operable to export the data on the run settings, measured attributes, predicted attributes, or combinations of these to an external computing device or system for further analysis. The data gathered on the run settings, measured attributes, predicted attributes, or combinations of these may be analyzed to identify short term and long term trends in operation of the converter 100.

The data generated continuously or periodically by the system 400 may be combined with machine learning algorithms to automatically update the operational models of the converter 100. Combining the generated data with machine learning algorithms may enable the control system 402 to automatically adjust operation of the converter 100 in response to short term or long term trends in operation of the converter 100. The system 400 may utilize continuous or periodic data generation and machine learning to modify operation of the converter 100 in response to changes in internal or external factors of the converter 100. The control system 402 may include machine readable and executable instructions 408 that, when executed by the one or more processors, may cause the control system 402 to analyze the data generated by the converter and identify one or more trends in operation of the converter 100 that deviate from normal steady state operation of the converter 100 as determined from the run settings and the operational models. The control system 402 may include statistical analysis software or equivalent machine readable and executable instructions 408 to enable the control system 402 to automatically perform statistical analysis of the data. In embodiments, statistical analysis of the data may be performed by one or more external computing systems that may be operable to receive the data from the control system 402, analyze the data, and upload the analysis back to the control system 402. The analysis uploaded back to the control system 402 may include identification of one or more deviations in one or more measured attributes compared to the predicted attributes determined from the operational models.

When a deviation from normal steady state operation of the converter 100 is identified by the control system 402 or external system, the system 400 may be operable to update the operational models to adapt operation of the converter 100 to bring the measured attributes of the glass articles 103, glass tube 102, or both back into specification. For updating the operational models, the control system 402 may include machine readable and executable instructions 408 that, when executed by the one or more processors 404, may cause the control system to automatically retrieve the plurality of condition sets from the one or more memory modules or from an external system; operate the converter 100 to convert the glass tubes 102 into a plurality of glass articles 103; measure the one or more attributes of the plurality of glass articles 103, glass tubes 102, or both using the at least one measurement device 360; adjust one or more of the plurality of process parameters to run the converter 100 at each of the plurality of condition sets; associate each of the plurality of glass articles with the condition set used to produce the glass article 103 and the one or more attributes measured; update the one or more operational models based on the one or more measured attributes and the plurality of condition sets for each of the plurality of glass articles 103, glass tubes 102, or both; determine the run setting for each of the plurality of process parameters based on the updated operational models; and operate the converter 100 at the run setting for each of the plurality of process parameters. In embodiments, the control system 402 may be operable to update the operational models according to a periodic schedule, which may be based on elapsed time or a number of glass articles 103 produced. The data generated by the system 400 may be used in feedback control of the converter 100.

The methods of converting glass tubes 102 to glass articles 103 with the system 400 disclosed herein may include identifying a trend in one or more of the attributes measured for the glass articles 103, glass tube 102, or both, updating the operational models in response to the identified trend to produce updated operational models, determining the run settings for each of the plurality of process parameters from the updated operational models, and operating the converter 100 at the updated run setting for each of the plurality of process parameters. Updating the operation models may include preparing the plurality of conditions sets for the converter 100, operating the converter 100 to convert the glass tube 102 into a plurality of glass articles 103, measuring one or more attributes of the plurality of glass articles 103, the glass tube 102, or both, adjusting one or more of the plurality of process parameters to run the converter 100 at each of the plurality of condition sets, and associating each of the plurality of glass articles 103 with the condition set used to produce the glass article 103 and the one or more attributes measured. The methods may further include updating the operational models based on the one or more attributes measured and the plurality of condition sets for each of the plurality of glass articles 103 to produce the updated operational models.

In embodiments, the system 400 may be operable to update the operational models in response to known or anticipated changes in external inputs to the converter 100. In embodiments, the external inputs may include variations in mass, dimensions, or quality of the glass tubes 102 supplied to the converter 100, changes in ambient environmental conditions (e.g., temperature, humidity, etc.) in a manufacturing environment of the converter 100, wear of system components of the converter 100, scheduled maintenance, changes in composition of fuel gas to burners 302 of the converter 100, other external input, or combinations of these. In embodiments, the control system 402 may include machine readable and executable instructions 408 that, when executed by the one or more processors 404, may cause the control system 402 to automatically update the one or more operational models in response to the change in the one or more of these external inputs to the converter 100, such as but not limited to variations in dimensions or quality of the glass tubes 102 supplied to the converter 100, ambient thermal conditions in a manufacturing environment of the converter 100, wear or failure of system components of the converter 100, changes in composition of fuel gas to burners 302 of the converter 100, or combinations of these. In embodiments, the control system 402 may include machine readable and executable instructions 408 that, when executed by the one or more processors 404, may cause the control system to automatically receive an input indicative of a change in one or more external inputs to the converter 100. The machine readable and executable instructions 408, when executed by the processor(s) 404, may cause the system to retrieve the plurality of condition sets from the one or more memory modules 406; operate the converter to convert the glass tubes 102 into a plurality of glass articles 103; measure the attributes of the plurality of glass articles 103, glass tubes 102, or both using the at least one measurement device 360; adjust one or more of the plurality of process parameters to run the converter 100 at each of the plurality of condition sets; associate each of the plurality of glass articles 103 with the condition set used to produce the glass article 103 and the one or more attributes measured; update the one or more operational models based on the one or more measured attributes and the plurality of condition sets for each of the plurality of glass articles 103; determine the run setting for each of the plurality of process parameters based on the updated operational models; and operate the converter 100 at the run setting for each of the plurality of process parameters.

Identifying Upset Conditions

In embodiments, the control system 402 may be operable to identify one or more upset conditions on the converter 100, such as but not limited to malfunctioning components of the converter 100, wrong size glass tube 102 loaded into the converter 100, missing glass tube 102, disruption in burner gas flow, disruptions in operation of ventilation systems, other upset condition, or combinations of these. Methods disclosed herein may include, while operating the converter 100 at the run setting for each of the plurality of process parameters, measuring the one or more attributes for each of the plurality of glass articles 103; determining one or more predicted attributes for each of the plurality of glass articles 103 from the plurality of process settings and the operational model; and comparing the one or more attributes measured for each of the plurality of glass articles 103 to the one or more predicted attributes to identify deviations from normal steady state operation of the converter 100. The methods may further include identifying an upset condition of the converter 100 based on the comparison of the one or more attributes measured for each of the plurality of glass articles 103 to the one or more predicted attributes based on the operational models, correcting the upset condition of the converter 100, and repeating the method of claim 1 following correction of the upset condition.

In any of the methods disclosed herein, the converter 100 may include a plurality of holders 130 and the methods disclosed herein may include securing one of a plurality of the glass tubes 102 in each of the plurality of holders 130 and passing each of the plurality of holders 130 and the glass tubes 102 disposed therein through the plurality of processing stations 106.

In any of the methods disclosed herein, each of the plurality of processing stations 106 of the converter 100 may be in a fixed position and the methods may include indexing the glass tube 102 through each of the processing stations 106 sequentially in succession. Alternatively, in embodiments, in any of the methods disclosed herein, the converter 100 may be a continuous converter, and the methods may include passing the glass tube continuously through the plurality of processing stations, where each of the plurality of processing stations may move in coordination with translation of the glass tube 102 during the active time.

Referring to FIG. 11, in embodiments, the system 400 may include a distributed computing environment comprising the converter 100 and control system 402, a network 410, and one or more external computing devices 420. The control system 402 may communicate with the external computing devices 420 through the network 410. One or more steps in the methods disclosed herein may be accomplished using the external computing devices 420 alone or in combination with the control system 402. Although shown in FIG. 11 as being directly communicatively coupled to the converter 100, it is understood that the control system 402 may additionally communicate with the converter 100 through the network 410. The network 410 may be a wired or wireless network. In embodiments, the network 410 may be a cloud network.

Embodiments of the disclosure may be embodied in hardware and/or in software (including firmware, resident software, micro-code, etc.). The control system 402 of the converter 100 and/or other controllers on the converter 100 may include at least one processor and the computer-readable storage medium (i.e., memory module) as previously described in this specification. The control system 402 may be communicatively coupled to one or more system components (e.g., converter 100, burner positioner 318, burner control valves, forming tool actuators 326, measurement device 360, converter drive system, etc.) via any wired or wireless communication pathway. A computer-usable or the computer-readable storage medium or memory module 406 may be any medium that can contain, store, communicate, propagate, or transport the program for use by or in connection with the instruction execution system, apparatus, or device.

The computer-usable or computer-readable storage medium or memory module 406 may be, for example but not limited to, an electronic, magnetic, optical, electromagnetic, infrared, or semiconductor system, apparatus, device, or propagation medium. More specific examples (a non-exhaustive list) of the computer-readable storage medium or memory module 406 would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable storage medium or memory module 406 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer-readable storage medium or memory module 406 may include the machine readable and executable instructions 408 for carrying out operations of the present disclosure. The machine readable and executable instructions 408 may include computer program code that may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

EXAMPLES

The following examples illustrate the operation of the disclosed system and methods for producing a plurality of glass articles from glass tube in a converter. The following examples are not intended to limit the scope of the present disclosure.

The following examples illustrate use of the disclosed systems and methods for initially setting up the converter 100 for converting glass tube to glass articles. Due to the hundreds of different process parameters that may be adjusted on a typical converter, the Examples herein are involve only a subset of these process parameters for the purpose of illustration and brevity. The glass tubing in these Examples was aluminosilicate glass tubing such as VALOR® glass manufactured and marketed by Corning Incorporated. The aluminosilicate glass tubing may be further processed by annealing and/or ion exchanging the glass tubing after converting. Although aluminosilicate glass is used in the examples, the effects of the systems and methods disclosed herein are not dependent on the type or composition of the glass.

The glass tubes were converted into glass articles using a converter. The converter used was a Vial Forming Machine Model RP18 with Automatic Tube Feeder manufactured by AMBEG Dr. J. Dichter GmbH, which included eighteen processing stations in the main circuit Descriptions of the processing stations of the main circuit of the converter used for the Examples are provided in Table 1 hereinbelow. Each of the processing stations in Table 1 may have one or more process parameters that can be taken into account when developing the condition sets for the converter. Each process parameter may have a preset value for a specific type or size of glass article being produced. Development of the condition sets may start with the preset value as a starting point.

TABLE 1

Description of the processing stations of the converter

| Station No. | Description of Operation | Type of Station |
| --- | --- | --- |
| A1 | Tube Loading and/or Cooling Station | Tube Loading/Cooling |
| A2 | Tube Drop to Determine the Vial Length | Tube Drop |
| A3 | Optional Separation Preheat | Heating |
| A4 | Separation Preheat | Heating |
| A5 | Separating | Separating |
| A6 | Flame Pierce of the Meniscus | Piercing |
| A7 | First Shoulder Preheat | Heating |
| A8 | Second Shoulder Preheat | Heating |
| A9 | Third Shoulder Preheat | Heating |
| A10 | Shoulder Forming | Forming |
| A11 | First Flange Preheat | Heating |

TABLE 1-continued

Description of the processing stations of the converter

| Station No. | Description of Operation | Type of Station |
|---|---|---|
| A12 | Second Flange Preheat | Heating |
| A13 | Flange forming | Forming |
| A14 | Flange Finish Preheat | Heating |
| A15 | Flange Finishing | Forming |
| A16 | Cooling or Heating | Cooling/Heating |
| A17 | Cooling or Forming | Cooling/Forming |
| A18 | Cooling and/or Measurement | Cooling/Measuring |

Example 1: Burner Setup

In Example 1, the methods of the present disclosure were used to develop run settings for three process parameters relating to burner setup of the converter 100. The three process parameters of Example 1 were the burner position in heating station A7, the burner position in heating station A8, and the rotational speed of the holder 130 (chuck speed). A subset of 18 condition sets were developed for modeling these three process parameters using JMP® Design of Experiments statistical analysis software. The subset of 18 condition sets are provided in Table 2.

TABLE 2

| Condition Set | Ref. No. in FIG. 12 | Holder Rate of Rotation (rpm) | A7 Burner Position (mm) | A8 Burner Position (mm) |
|---|---|---|---|---|
| 1 | 1201 | 450 | 2 | −2 |
| 2 | 1202 | 450 | −2 | 2 |
| 3 | 1203 | 450 | 0 | 0 |
| 4 | 1204 | 350 | 2 | 0 |
| 5 | 1205 | 350 | −2 | −2 |
| 6 | 1206 | 400 | 2 | 2 |
| 7 | 1207 | 450 | 2 | 2 |
| 8 | 1208 | 400 | −2 | 0 |
| 9 | 1208 | 450 | 0 | −2 |
| 10 | 1210 | 350 | −2 | 2 |
| 11 | 1211 | 450 | −2 | −2 |
| 12 | 1212 | 350 | 2 | −2 |
| 13 | 1213 | 350 | 0 | 2 |
| 14 | 1214 | 350 | 2 | 2 |
| 15 | 1215 | 450 | 2 | 0 |
| 16 | 1216 | 350 | −2 | −2 |
| 17 | 1217 | 450 | −2 | 2 |
| 18 | 1218 | 400 | 2 | −2 |

Figure 12:
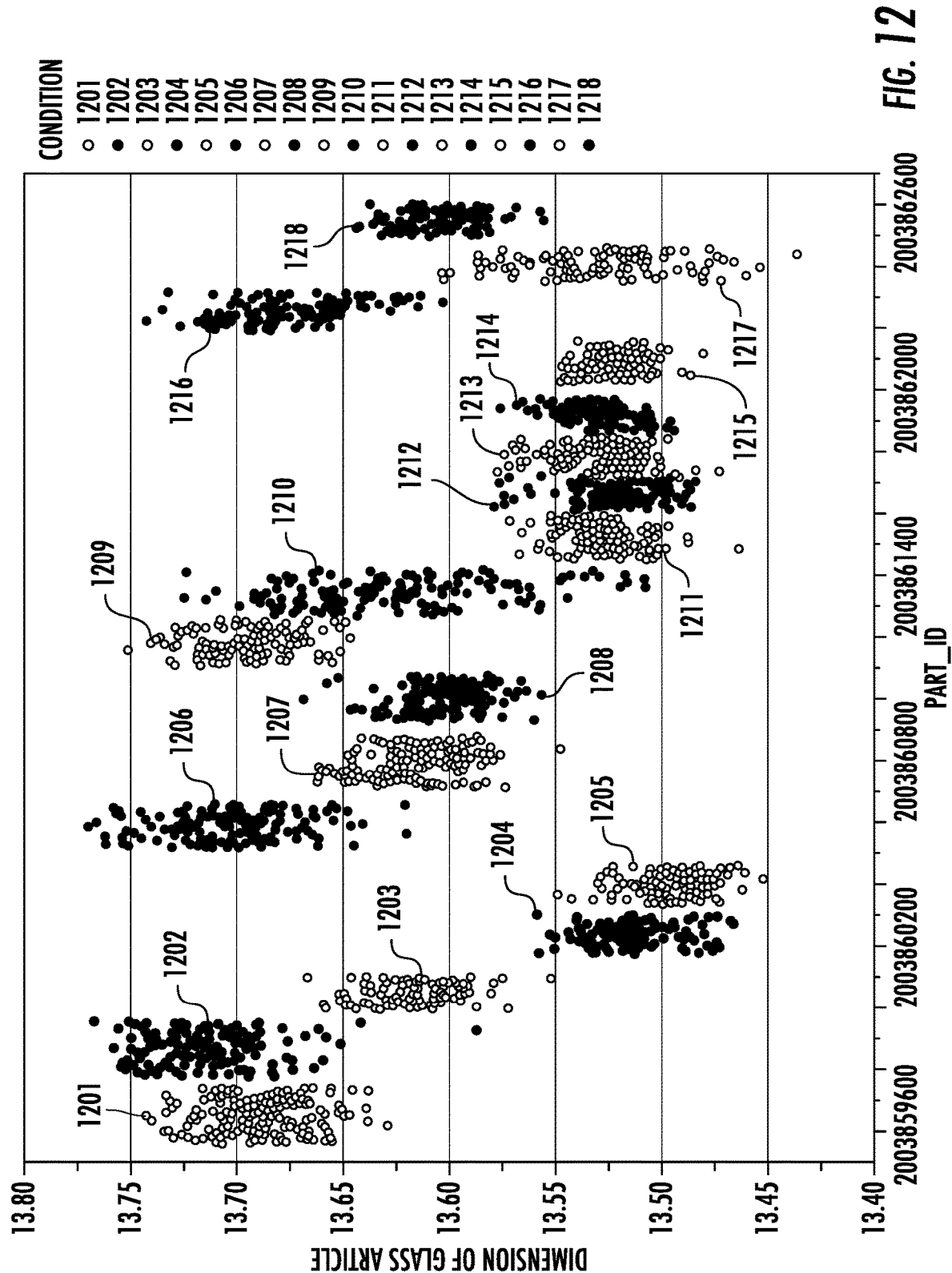
FIG. 12 graphically depicts a dimension of a glass article (y-axis) as a function of the unique identifier of the glass article (x-axis) for a plurality of condition sets, according to one or more embodiments shown and described herein.

The converter 100 was run at each of the conditions sets in Table 1 to produce 60 glass articles at each condition set. Five different dimensions/angles were measured for each of the glass articles produced at each condition set. Each glass article was assigned identifier/part number and the dimensions/angles measured and the condition set was associated with each glass article in a relational database. Referring to FIG. 12, the data for one of the dimensions measured for the glass articles of Example 1 as a function of part number is graphically depicted. As shown in FIG. 12, the data points are grouped by the condition set used to make the glass articles 103.

Figure 13:
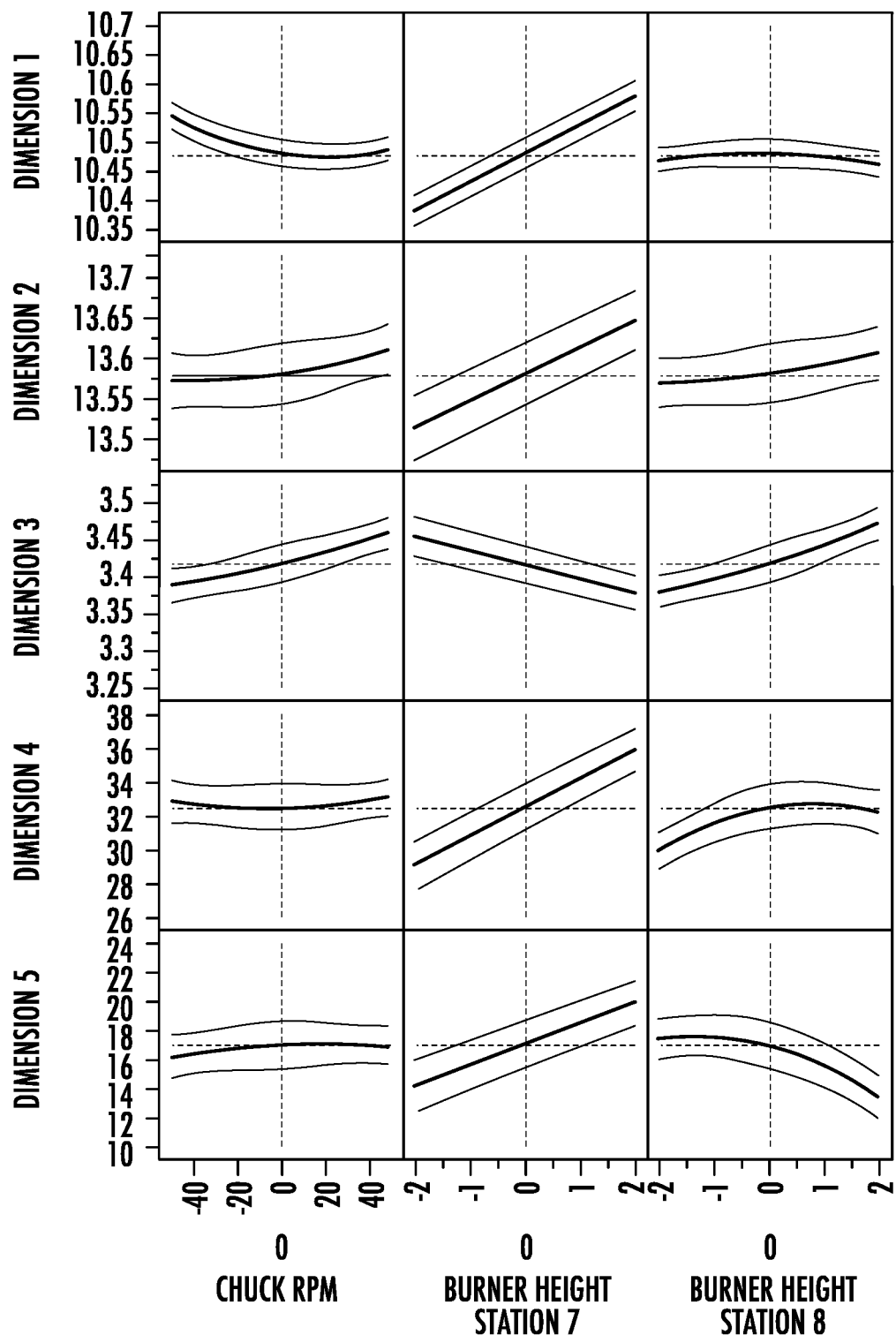
FIG. 13 graphically depicts a plurality of operational models developed from the dimension data and conditions sets from FIG. 12, according to one or more embodiments shown and described herein.

The data on the measured dimensions/angles and the condition sets for each glass article were then analyzed using the JMP® statistical analysis software to develop a plurality of operational models relating the process parameters to each of the measured dimensions/angles. Referring to FIG. 13, graphical representations for the operational models developed from the data in Example 1 are provided for purposes of illustration. It is understood that the control system 402 uses the empirical mathematical expression of the model rather than the graphical representation to determine the run settings for the converter.

Example 2: Forming Station Setup

In Example 2, the methods of the present disclosure were used to develop run settings for five process parameters relating to a forming setup involving one heating station (A14 in Table 1) and one forming station (A15 in Table 1) positioned immediately downstream of the heating station. The five process parameters of Example 2 included a relative burner gas flow rate in heating station A14, the burner position in heating station A14, the position of a first forming tool in forming station A15, the end time of contact of the first forming tool with the glass tube, and the end time of contact of a second forming tool with the glass tube in the forming station A15. The relative burner gas flow rate is a flowrate of the fuel gas delivered to the burner divided by a reference burner gas flow rate. A subset of 24 condition sets were developed for modeling these five process parameters using JMP® Design of Experiments statistical analysis software. The sub set of 24 condition sets of Example 2 are provided in Table 3.

TABLE 3

| Condition Set | Ref. No. in FIG. 14 | A14 Relative Gas Flow | A14 Burner Position (mm) | A15 First Tool Position (mm) | A15 First Tool End Time (Machine Angle) | A15 Second Tool End Time (Machine Angle) |
|---|---|---|---|---|---|---|
| 1 | 1401 | 1 | 9.2 | 0.08 | 290 | 330 |
| 2 | 1402 | 1 | 8.2 | 0.08 | 230 | 270 |
| 3 | 1403 | 1 | 9.2 | 0.14 | 260 | 300 |
| 4 | 1404 | 2.5 | 9.2 | 0.14 | 290 | 330 |
| 5 | 1405 | 1 | 8.2 | 0.14 | 290 | 330 |
| 6 | 1406 | 1 | 8.2 | 0.08 | 260 | 300 |
| 7 | 1407 | 2.5 | 9.2 | 0.08 | 290 | 330 |
| 8 | 1408 | 1.75 | 8.2 | 0.14 | 230 | 270 |
| 9 | 1409 | 2.5 | 8.2 | 0.08 | 290 | 330 |
| 10 | 1410 | 2.5 | 8.2 | 0.14 | 290 | 330 |
| 11 | 1411 | 1.75 | 8.7 | 0.11 | 260 | 300 |
| 12 | 1412 | 1 | 8.7 | 0.14 | 290 | 270 |
| 13 | 1413 | 1.75 | 8.2 | 0.08 | 230 | 330 |
| 14 | 1414 | 2.5 | 9.2 | 0.08 | 260 | 300 |
| 15 | 1415 | 1.75 | 9.2 | 0.08 | 230 | 270 |
| 16 | 1416 | 1 | 9.2 | 0.14 | 290 | 330 |
| 17 | 1417 | 1 | 9.2 | 0.11 | 230 | 270 |
| 18 | 1418 | 2.5 | 8.2 | 0.11 | 230 | 270 |
| 19 | 1419 | 1 | 8.7 | 0.08 | 290 | 330 |
| 20 | 1420 | 2.5 | 8.2 | 0.14 | 260 | 300 |
| 21 | 1421 | 1 | 8.2 | 0.11 | 290 | 330 |
| 22 | 1422 | 2.5 | 9.2 | 0.14 | 230 | 270 |
| 23 | 1423 | 2.5 | 8.62 | 0.08 | 230 | 270 |
| 24 | 1424 | 1.75 | 8.7 | 0.11 | 260 | 300 |

Figure 14:
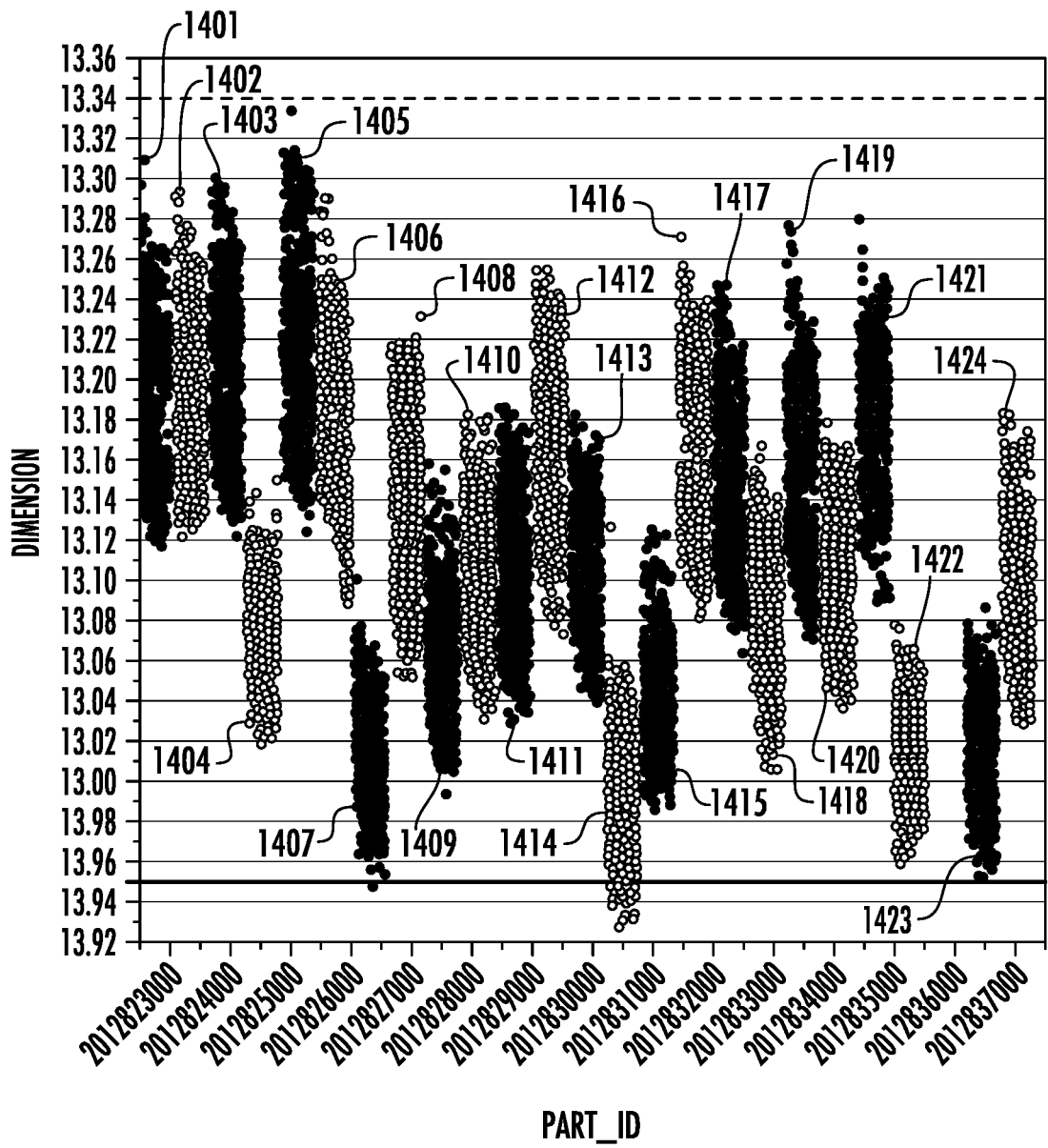
FIG. 14 graphically depicts a dimension of a glass article (y-axis) as a function of the unique identifier of the glass article (x-axis) for a plurality of condition sets, according to one or more embodiments shown and described herein.

The converter 100 was run at each of the conditions sets in Table 3 to produce 60 glass articles at each condition set. 2 dimensions and 2 cosmetic attributes were measured for each of the glass articles produced at each condition set. Additionally, an overall desireability property of each glass article was determined from the measurements of the 2 dimensions and 2 cosmetic attributes. Each glass article was assigned a unique identifier/part number and the attributes measured and the condition set was associated with each glass article in a relational database. Referring to FIG. 14, the data for one dimension measured for the glass articles of Example 2 as a function of part number is graphically depicted. As shown in FIG. 14, the data points are grouped by the condition set used to make the glass articles 103.

Figure 15:
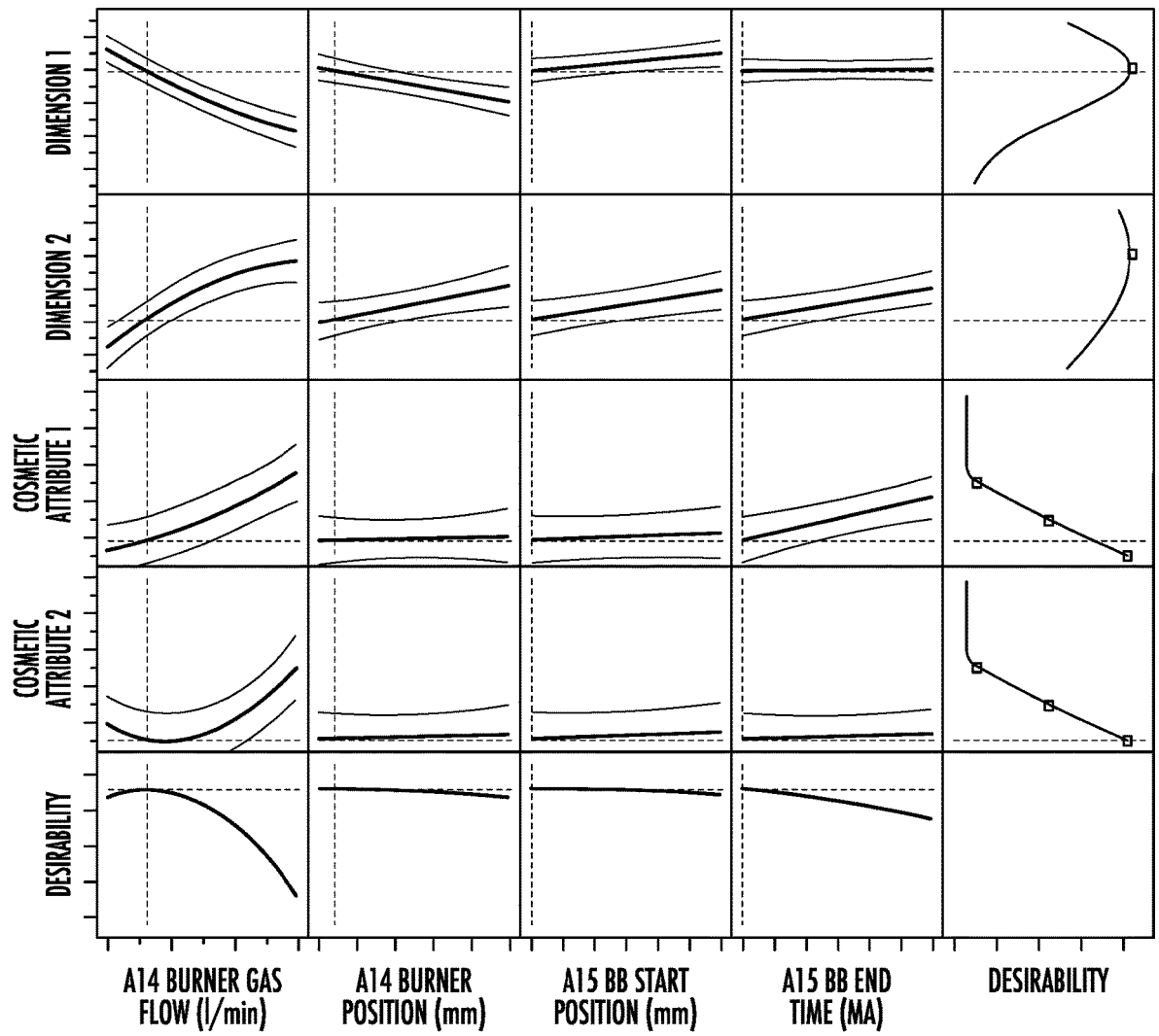
FIG. 15 graphically depicts a plurality of operational models developed from the dimension data and conditions sets from FIG. 14, according to one or more embodiments shown and described herein.

The data on the measured dimensions/angles and the condition sets for each glass article were then analyzed using the JMP® statistical analysis software to develop a plurality of operational models relating the process parameters to each of the measured dimensions, measured cosmetic attributes, and the overall desirability. Referring to FIG. 15, graphical representations for the operational models developed from the data in Example 2 are provided for purposes of illustration.

While various embodiments of the converter 100 and system and methods for producing a plurality of articles from glass tubes 102 have been described herein, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system for converting glass tubes into glass articles, the system comprising:
    a converter comprising:
        a plurality of holders, each of which is operable to hold a glass tube and rotate the glass tube about a center axis of the glass tube;
        a plurality of processing stations comprising at least one heating station, at least one forming station, and at least one separating station;
        at least one measurement device operable to measure one or more attributes of each of the glass articles produced from the glass tubes, each of the glass tubes, or both; and
    a control system communicatively coupled to the converter, the control system comprising one or more processors, one or more memory modules communicatively coupled to the one or more processors, and machine readable and executable instructions stored on the one or more memory modules, the machine readable and executable instructions, when executed by the one or more processors, cause the control system to automatically:
        operate the converter to convert the glass tubes into the glass articles;
        measure one or more attributes of the glass articles, the glass tubes, or both with the at least one measurement device;
        adjust a plurality of process parameters of the converter to run the converter at each of a plurality of condition sets, wherein each of the plurality of condition sets comprises settings for the plurality of process parameters;
        associate each of the plurality of glass articles with one of the plurality of condition sets that is used to produce the glass article and the one or more attributes measured; and
        develop one or more operational models based on the one or more attributes measured and the plurality of condition sets, wherein each of the one or more operational models relates one or more of the plurality of process parameters to the one or more attributes of the glass articles, the glass tubes, or both.

2. The system of claim 1, wherein the machine readable and executable instructions, when executed by the one or more processors, further cause the control system to automatically:
    determine a run setting for each of the plurality of process parameters based on the one or more operational models; and
    operate the converter with each of the plurality of process parameters set to the run setting determined from the one or more operational models.

3. The system of claim 2, wherein the machine readable and executable instructions, when executed by the one or more processors, further cause the control system to automatically:
    measure the one or more attributes for each of the plurality of glass articles, glass tubes, or both while operating the converter with each of the plurality of process parameters set to the run setting;
    determine one or more predicted attributes for each of the plurality of glass articles, glass tubes, or both from the plurality of process settings and the one or more operational models;
    compare the one or more attributes measured for each of the plurality of glass articles, glass tubes, or both to the one or more predicted attributes; and
    identify a deviation from normal operating conditions based on the comparison.

4. The system of claim 2, wherein the machine readable and executable instructions, when executed by the one or more processors, further cause the control system to automatically update the one or more operational models according to a regular periodic time interval, in response to a user input, in response to a change in operating hardware of the converter, in response to a change in one or more external inputs to the converter, or combinations of these.

5. The system of claim 4, wherein the machine readable and executable instructions, when executed by the one or more processors, further cause the control system to automatically update the one or more operational models in response to the change in the one or more external inputs to the converter, wherein the one or more external inputs to the converter comprise variations in dimensions or quality of the glass tubes supplied to the converter, ambient thermal conditions in a manufacturing environment of the converter, wear or failure of system components of the converter, changes in composition of fuel gas to burners of the converter, or combinations of these.

6. The system of claim 4, wherein when updating the one or more operational models, the machine readable and executable instructions, when executed by the one or more processors, further cause the control system to automatically:
    retrieve the plurality of condition sets from the one or more memory modules;
    operate the converter to convert the glass tubes into a plurality of glass articles;
    measure one or more attributes of the plurality of glass articles, the glass tubes, or both with the at least one measurement device;
    adjust one or more of the plurality of process parameters to run the converter at each of the plurality of condition sets;

associate each of the plurality of glass articles with the condition set used to produce the glass article and the one or more attributes measured;

update the one or more operational models based on the one or more attributes measured and the plurality of condition sets for each of the plurality of glass articles;

determine the run setting for each of the plurality of process parameters based on the one or more updated operational models; and operate the converter at the run setting for each of the plurality of process parameters.

7. The system of claim 2, wherein the machine readable and executable instructions, when executed by the one or more processors, further cause the control system to automatically:

receive an input indicative of replacement of one or more components of the converter;

develop a subset of condition sets, wherein the subset of condition sets comprises settings for a subset of process parameters of the converter relating to the replacement of the one or more components;

operate the converter to convert the glass tubes into a plurality of glass articles;

measure one or more attributes of the plurality of glass articles, the glass tubes, or both using the at least one measurement device;

adjust one or more of the plurality of process parameters to run the converter at each of the condition sets in the subset of condition sets;

associate each of the plurality of glass articles with the condition set used to produce the glass article and the one or more attributes measured;

update the one or more operational models based on the one or more measured attributes and the subset of condition sets for each of the plurality of glass articles;

determine a run setting for each of the plurality of process parameters based on the one or more updated operational models; and operate the converter with each of the plurality of process parameters set to the run setting determined from the one or more updated operational models.

8. The system of claim 1, wherein the machine readable and executable instructions, when executed by the one or more processors, further cause the control system to automatically:

assign a unique identifier to each of the plurality of glass articles as it is produced;

track each of the plurality of glass articles produced through the converter by the unique identifier; and associate the unique identifier of each of the plurality of glass articles with the condition set used to produce the glass article and the one or more attributes measured for the glass article, the glass tube from which the glass article is produced, or both.

9. The system of claim 8, further comprising a relational database stored on the one or more memory modules, wherein the machine readable and executable instructions, when executed by the one or more processors, further cause the control system to automatically store the unique identifier, the condition set, and the one or more attributes measured for each glass article, glass tube, or both in the relational database.

10. The system of claim 1, wherein the machine readable and executable instructions, when executed by the one or more processors, further cause the control system to automatically:

receive an input indicative of a change in a type of glass article produced by the converter from a first glass article to a second glass article, wherein the change in the type of the glass article comprises a change in size, shape, or both of the glass article, glass tube, or both;

operate the converter to convert the glass tubes into a plurality of second glass articles;

measure one or more attributes of the plurality of second glass articles using the at least one measurement device;

adjust one or more of the plurality of process parameters to run the converter at each of the plurality of condition sets;

associate each of the plurality of second glass articles with the condition set used to produce the second glass article and the one or more attributes measured;

develop one or more operational models for the second glass article based on the one or more attributes measured and the plurality of condition sets for each of the plurality of second glass articles;

determine a run setting for each of the plurality of process parameters based on the one or more second operational models; and operate the converter with each of the plurality of process parameters set to the run setting determined from the one or more second operational models.

* * * * *